US008250492B2

(12) United States Patent
Kondaks

(10) Patent No.: US 8,250,492 B2
(45) Date of Patent: Aug. 21, 2012

(54) METHOD FOR EVALUATING IMAGES DISPLAYED ON THE INTERNET

(76) Inventor: Anthony C. Kondaks, Mesa, AZ (US)

( * ) Notice: Subject to any disclaimer, the term of this patent is extended or adjusted under 35 U.S.C. 154(b) by 958 days.

(21) Appl. No.: 11/818,407

(22) Filed: Jun. 14, 2007

(65) Prior Publication Data

US 2007/0299744 A1 Dec. 27, 2007

Related U.S. Application Data

(60) Provisional application No. 60/816,247, filed on Jun. 23, 2006, provisional application No. 60/872,307, filed on Nov. 30, 2006.

(51) Int. Cl.
*G06F 17/00* (2006.01)
(52) U.S. Cl. ..................... 715/859; 715/771; 358/474
(58) Field of Classification Search .......... 715/273–275, 715/741–762, 859
See application file for complete search history.

(56) References Cited

U.S. PATENT DOCUMENTS

| 5,743,407 A * | 4/1998 | Williams ................. 206/575 |
| 6,693,647 B1 * | 2/2004 | Bernard et al. ............ 715/700 |
| 2002/0080168 A1 * | 6/2002 | Hilliard et al. ............ 345/744 |
| 2002/0169805 A1 * | 11/2002 | Edge ........................ 707/528 |
| 2007/0002035 A1 * | 1/2007 | Plut .......................... 345/211 |

OTHER PUBLICATIONS

Carrie A. Johnson, "USeCommerce:2005 to 2010 a Five-year Forecast and Analysis of US Online Retail Sales", forrester.com/research/Document/Excerpt/0,7211,37626,00.html, Sep. 14, 2005, 1 page (summary), forrester.com, USA.
Brenda J. Buote, "Learning tricks of the eBay trade," Boston Globe found at Boston.com/news/local/articles/2006/01/08/learning_tricks_of_the_ebay_trade/, Jan. 8, 2006, 3 pages, boston.com, Boston, MA, USA.
InternetRetailer.com, "Higher incomes users demand higher quality web images, says new survey", internetretailer.com/internet/marketing-conference/19978-higher-income-users-demand-higher-quality-web-images-says-new-survey.html, Mar. 5, 2002, internetretailer.com, USA.

* cited by examiner

*Primary Examiner* — Doug Hutton
*Assistant Examiner* — Quoc A Tran

(57) ABSTRACT

A method that enables an internet user to determine whether an image viewed truly represents the color, clarity, and depiction of the item the image represents. A test pattern-like graphic, made up of a series of bars, shapes, lines, and shadings, is photographed or scanned alongside an item and published to the internet. The viewer compares the published graphic with a hardcopy of the same graphic. Inconsistencies in depiction between the two graphics enable the viewer to determine the extent to which the image appearing alongside the published graphic fairly represents the item the image represents. Revenue is generated through licensing of the graphic to both internet displayers and viewers as well as advertising space on the graphic. The graphic can appear in different versions and sizes through different media: hardcopy, digitized on the internet, broadcast television.

4 Claims, 18 Drawing Sheets

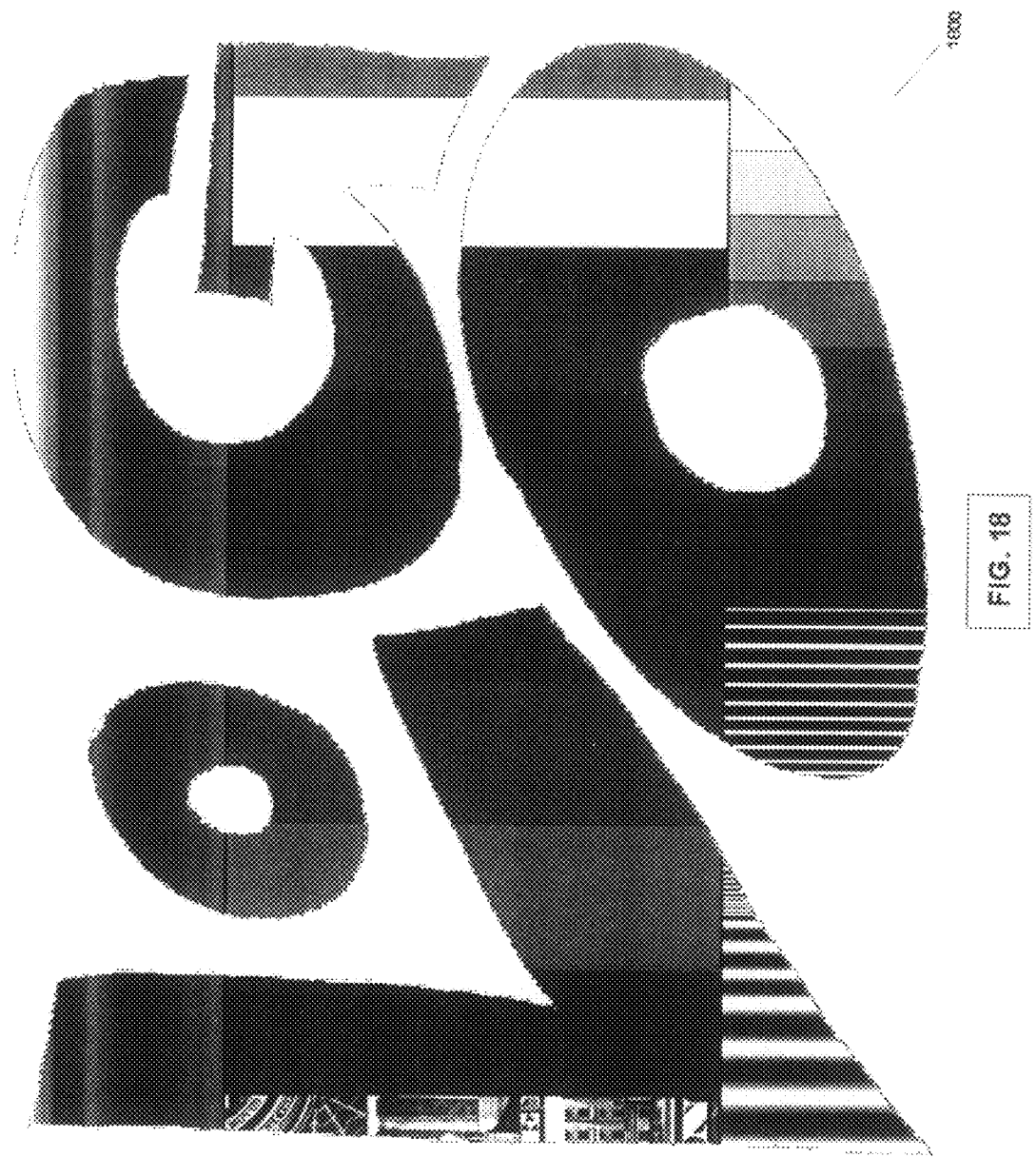

METHOD FOR EVALUATING IMAGES DISPLAYED ON THE INTERNET

This application claims the benefit of U.S. Provisional Application No. 60/816,247, filed Jun. 23, 2006 and U.S. Provisional Application No. 60/872,307, filed Nov. 30, 2006.

BACKGROUND

This invention relates to providing a method that enables a viewer of images displayed on the internet to determine whether the items represented by those images are properly depicted in terms of color and clarity.

The internet provides viewers with both text and images. Images demonstrate, depict, illustrate, and represent physical items and are used, amongst many purposes, for entertainment, education, commerce, and gaming. Commerce via the internet is a major part of the U.S. economy. Retail internet sales totaled $172 billion in 2005.

One U.S. company, the online auction retailer eBay Inc., accounted for $43 billion of those sales. As is often the case with products offered for sale on the internet, most eBay auctions include a photograph or scan of the item for sale.

The decision whether to purchase an item for sale on internet sites is often dependent upon a product's visual features. This is particularly true for items such as clothing, fashion, baseball cards, stamps, and antiques. It is therefore important to the viewer as a potential purchaser that features such as color are accurately depicted in the image of an item that appears on the viewer's computer monitor.

A blue and green striped polo shirt that appears as purple and yellow in the image displayed on the computer monitor misrepresents the actual features of the product. There are a variety of reasons for these misrepresentations: inferior photographing or scanning equipment; improper lighting; poor scanning or photographing skills on the part of the displayer/seller; uploading, downloading or server imperfections. Should the viewer purchase the polo shirt under the mistaken impression he will receive a purple and yellow shirt, he will not be satisfied and the actual blue and green striped product will either be returned or the purchase considered unsatisfactory, creating negative goodwill or loss to the seller and wasted time and money for the buyer.

A Greenfield Online survey in March of 2002 found that:
- 81% of consumers say that a clear picture of the product is very or extremely important when buying online.
- 64% of users sometimes or very frequently do not complete an online purchase due to poor image quality or difficulties loading the pages
- 55% of respondents who have been faced with poor image quality or difficulty loading the pictures during the online sales cycle either give up on the purchase or buy from the competition.
- Only 8% of those surveyed said they return to the site later to purchase the item Therefore, it is indisputable that color, clarity and depiction in an image are important factors in a buying decision. As such, there is a need for a method that will enable viewers of images or potential purchasers of items offered for sale to determine the true color, clarity and depiction of the item being represented by images that appear on the internet.

There is also a need for determining proper depiction in images on the internet in non-purchasing instances. Anyone desirous of communicating a "true" image of an object over the internet needs to aid the viewer in evaluating the color, clarity and depiction of the item being represented by the image he sees. Viewers in a myriad of fields depend upon the accuracy of internet images: scientists examining a photograph posted to a website; students studying images on an internet course; fashion designers in New York coordinating a new line of clothing with the head office in Paris.

This image evaluation system also has an application for broadcast television. With the advent of TV sellers on home shopping networks such as QVC where products are sold as they are "pitched" and viewers can call in and make their purchase, there is a need for proper depiction of the images that appear.

Further information on this image evaluation system can be found at www.iDepict.com.

OBJECTS AND FEATURES OF THE INVENTION

A primary object and feature of the present invention is to provide a system for enabling viewers of images on the internet to evaluate and determine the accuracy of the colors, clarity, and depiction of the images that they view. It is a further primary object and feature of the present invention to provide such a system that is easy and inexpensive for the viewer to use.

It is another primary object and feature of the present invention to provide the displayer of internet images with such a system that is easy and inexpensive to use.

It is yet another primary object and feature of the present invention to provide such a system that relies on the viewer's visual inspection and comparison capabilities to evaluate the image being viewed.

It is still yet another primary object and feature of the present invention to provide such a system that places the viewer of images on the internet in a superior position to make a decision of action regarding items portrayed by such images.

And it is still yet another primary object and feature of the present invention to provide a means to enable third parties to advertise through the use of such a system. Other objects and features of this invention will become apparent with reference to the following descriptions.

SUMMARY OF THE INVENTION

In accordance with a preferred embodiment hereof, this invention provides a method, relating to enabling a viewer to evaluate the accuracy of the depiction of an item represented by an image on the internet, comprising the steps of: offering an object graphic for sale by a licensor for purchase by at least one displayer of images on the internet; wherein that object graphic would be placed beside the item to be displayed and either photographed or scanned; wherein the combined image of the item and object graphic would be digitized through the photographing or scanning process; whereby the combined image would be published to the internet site at which the displayer displays such image; whereby a viewer would view such a combined image in a viewing window on the personal computer monitor that is connected to the internet.

Moreover, this invention provides such a method further comprising the steps of: the licensor offering a reference graphic for sale, which is identical to the object graphic, for purchase by at least one viewer of images displayed on the internet; whereby the viewer of the image of the object graphic that appears in the aforementioned window can simultaneously physically hold up in his hand the reference graphic and place it beside the personal computer monitor for comparison purposes. Moreover, this invention provides such a method further comprising the steps of: The viewer visually inspecting and comparing the color, clarity and depiction of the object graphic in the computer window with the color, clarity and depiction of the reference graphic held in his hand; wherein the viewer can evaluate and compare the color, clarity and depiction of the image of the item to the extent that the color, clarity and depiction of the item's accompanying object graphic matches the color, clarity and depiction of the reference graphic; wherein the viewer can make a decision of action regarding the item based upon such an evaluation.

Moreover, this invention provides such a method further comprising the steps of: the licensor computer-generating, scanning, or photographing a reference graphic which is identical to the object graphic; wherein that reference graphic is digitized as a result of that computer-generating, photographing, or scanning process; whereby the image of that reference graphic is published to the licensor's internet site, whereby the viewer of the image graphic that appears in the aforementioned window can view the reference graphic located at the licensor's internet site in a second separate window. Moreover, this invention provides such a method further comprising the steps of: The viewer visually inspecting and comparing the color, clarity and depiction of the object graphic in one window with the color, clarity and depiction of the reference graphic in the second window; wherein the viewer can evaluate and compare the color, clarity and depiction of the image of the item to the extent that the color, clarity and depiction of the item's accompanying object graphic matches the color, clarity and depiction of the reference graphic; wherein the viewer can make a decision of action regarding the item based upon such an evaluation.

In accordance with another preferred embodiment hereof, this invention provides a method, relating to enabling a viewer to evaluate the accuracy of the depiction of an item represented by an image on the internet while viewing advertising, comprising the steps of: the licensor offering advertising space to an entity—commercial or otherwise—desirous of advertising goods, services or information; wherein the licensor computer-generating, scanning, or photographing a reference graphic including within it a section that advertises the advertiser's goods, services, or information (the ad); wherein that reference graphic with the ad is digitized as a result of that computer-generating, photographing or scanning process; whereby the image of that reference graphic with the ad is published to the licensor's internet site, whereby the viewer can view the image of the reference graphic with ad.

In accordance with another preferred embodiment hereof, this invention provides a method, relating to enabling a viewer to evaluate the accuracy of the depiction of an item represented by an image on the internet or broadcast television while viewing advertising, comprising the steps of: the licensor offering advertising space to an entity—commercial or otherwise—desirous of advertising goods, services or information; wherein the licensee prints onto the reference graphic/object graphic an advertisement which does not compromise the colors or utility of the reference graphic/object graphic; wherein that reference graphic/object graphic is sold and distributed to viewers/buyers and displayers/sellers of internet or TV broadcast images, whereby the viewer can view the image of the reference graphic with ad.

In accordance with another preferred embodiment hereof, this invention provides a method, relating to enabling a viewer to evaluate the accuracy of the depiction of an item represented by an image on the internet or broadcast television to use the "patent green" color scheme of a section of the digitized version of the reference graphic to ensure color consistency, comprising the steps of: the licensor including "patent green" as two of the color bars that are included in all versions of the reference graphic/object graphic; whereby the viewer can view the digitized version of the reference graphic on the licensor's website; wherein the viewer can compare the patent green bars on the digitized reference graphic with the patent green of U.S. currency the viewer holds up to the computer monitor or television screen; whereby the viewer can determine by comparison of the patent green of the digitized image with the patent green of the U.S. currency he possesses whether the image of the reference graphic on the monitor or screen is true.

DEFINITIONS, ACRONYMS AND CROSS-REFERENCES

Reference graphic. The reference graphic is a rectangular-shaped graphic containing specific colors, lines and shadings that resembles a test pattern. It can be digitized through the process of computer-generating or by photographing or scanning a hardcopy. It is published on the internet where it can appear in a window so that a viewing of it and a comparison between it and the object graphic can be made by a Viewer. The reference graphic may or may not contain a section within it in which advertising appears. If there is advertising, it will be small enough and strategically placed so as not to impact the function and purpose of the reference graphic The reference graphic is identical to the object graphic except when one or the other contains advertising. It may appear in hardcopy, digitized or televised form.

Object graphic. The object graphic is identical to the reference graphic except when one or the other contains advertising. It may appear in hardcopy, digitized or televised form.

Computer-generating. Computer-generating is creating images using a personal computer and image-generating software programs whereby the image appears on a computer viewing monitor and can be saved, printed or uploaded to the internet.

Window or viewing window. A window or viewing window is the viewing environment popularized by Microsoft Corporation operating system software that prevails on personal computers in the world today. Single or multiple windows can be "open" on a viewing monitor at one time. Internet Explorer is the Microsoft windows environment.

Viewer. A viewer is an individual who is viewing images of items in window(s) displayed on the internet via viewing monitors connected to personal computers or on a television screen. These items may or may not be for sale. A viewer may need to make a decision of action regarding the item represented by the image he is viewing, such as purchasing that item. A viewer may also view items on broadcast television.

Advertiser. An advertiser is an individual or organization—commercial or otherwise—desirous of advertising goods, services or information through visual advertising on a section of the reference graphic/object graphic—appearing on a computer monitor or television screen or hardcopy—reserved for that purpose.

Calibration. A process whereby a viewer can check, adjust, or determine by comparison with a standard the colors and clarity of an image on the internet.

Patent Green. The official color and dye used by the United States Bureau of Engraving and Printing for the green color on the back of United States currency.

Broadcast television. Any television program or images received and viewed by the viewer, whether received via cable, satellite, air waves or any manner at all.

Hook and loop fastener. A dime-sized adhesive mechanism enabling the affixing of a object to another object, in this instance the affixing of the hardcopy reference graphic to the border of a computer monitor or television set.

Licensing. In addition to the regularly accepted uses of this term, licensing can also include free distribution of the reference or object graphic in any of its forms.

BRIEF DESCRIPTION OF THE DRAWINGS

FIG. 18 is the graphic in the image evaluation process used as both the reference graphic in the form of a company's logo and the object graphic in the form of a company's logo. Both versions are identical. This graphic can be hardcopy, digitized, or televised.

DETAILED DESCRIPTION OF THE BEST MODES AND PREFERRED EMBODIMENTS OF THE INVENTION

With the intention of enabling the present invention to be more readily understood by those skilled in the art, while at the same time disclosing the advantages that are afforded by the present invention, the following description is subdivided to provide an overview of the primary components and participants giving rise to a preferred embodiment of the present invention. Within each subsection of this description, reference is made by title to other system components and participants when and as necessary to assist in understanding system inter-relationships. Following the description of each subcomponent and an identification of the pathways of communication between components, a description of the interaction of the components and participants in functional application as taught by the present invention is provided.

In the accompanying drawings, well-known structures and devices are shown in block diagram form in order to provide an understanding of the interrelationships between components and participants and the flow of information and control throughout the described preferred embodiment of the present invention. It will be apparent to one skilled in the art that the invention may, under appropriate circumstances, be practiced with a variety of different specific components (without detraction or departure from the scope of the present invention) provided to serve the generalized block diagram description.

Overview

A fundamental principle as taught by the present invention rests upon the premise that viewers of images on the internet who rely upon the images they see to make decisions of actions regarding the items these images represent are desirous of a method that will enable them to evaluate the accuracy of the color, clarity and depiction of those images.

Figure 1:
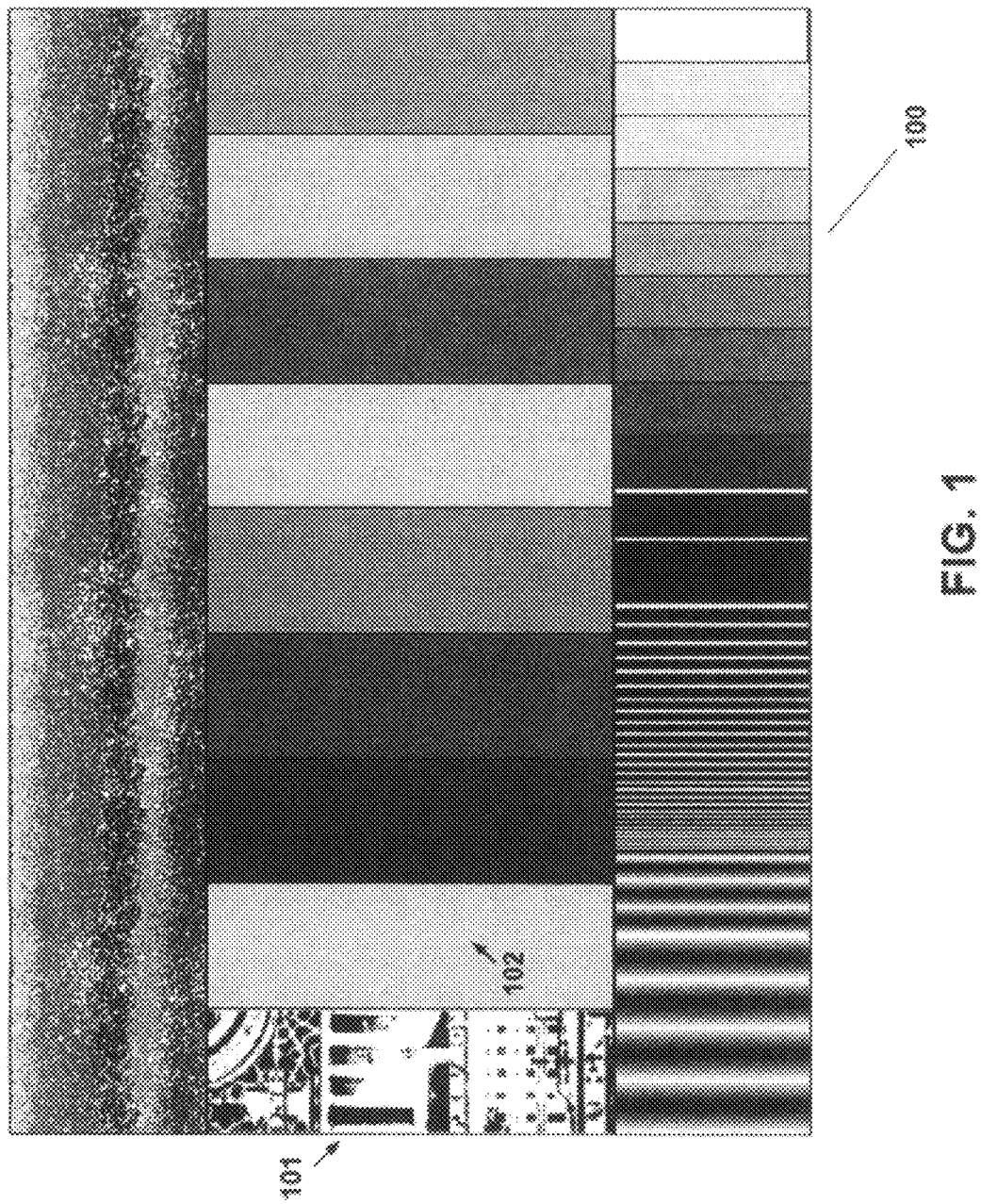
FIG. 1 is the actual graphic in the image evaluation process used as both the reference graphic and the object graphic. Except when there is advertising present on the graphic, the reference graphic and the object graphic are identical. Note to reader: depending upon its utility within a particular embodiment of the current invention, the graphic will be described throughout this text as either the reference graphic or object graphic but they are nevertheless identical (except where advertising is concerned). This graphic can be hardcopy, digitized, or televised.

Referring to FIG. 1, the graphic used in the image evaluation process is presented. According to a preferred embodiment of the present invention, this graphic 100 is both the reference graphic and the object graphic. The reference graphic is identical to the object graphic, except when one or the other contains advertising. Although the reference graphic/object graphic can be of various sizes, the 8½"×11" version 100 is presented here. Two sections 101, 102 of the reference graphic/object graphic are the color of Patent Green, the official color and dye used by the United States Bureau of Engraving and Printing for the green color on the back of United States currency. One of these sections 101 is made up of reproductions of snippets of various U.S. currency; the other section 102 is solid Patent Green. The reference graphic/object graphic can be displayed in various media: hardcopy, digitized, televised.

Figure 2:
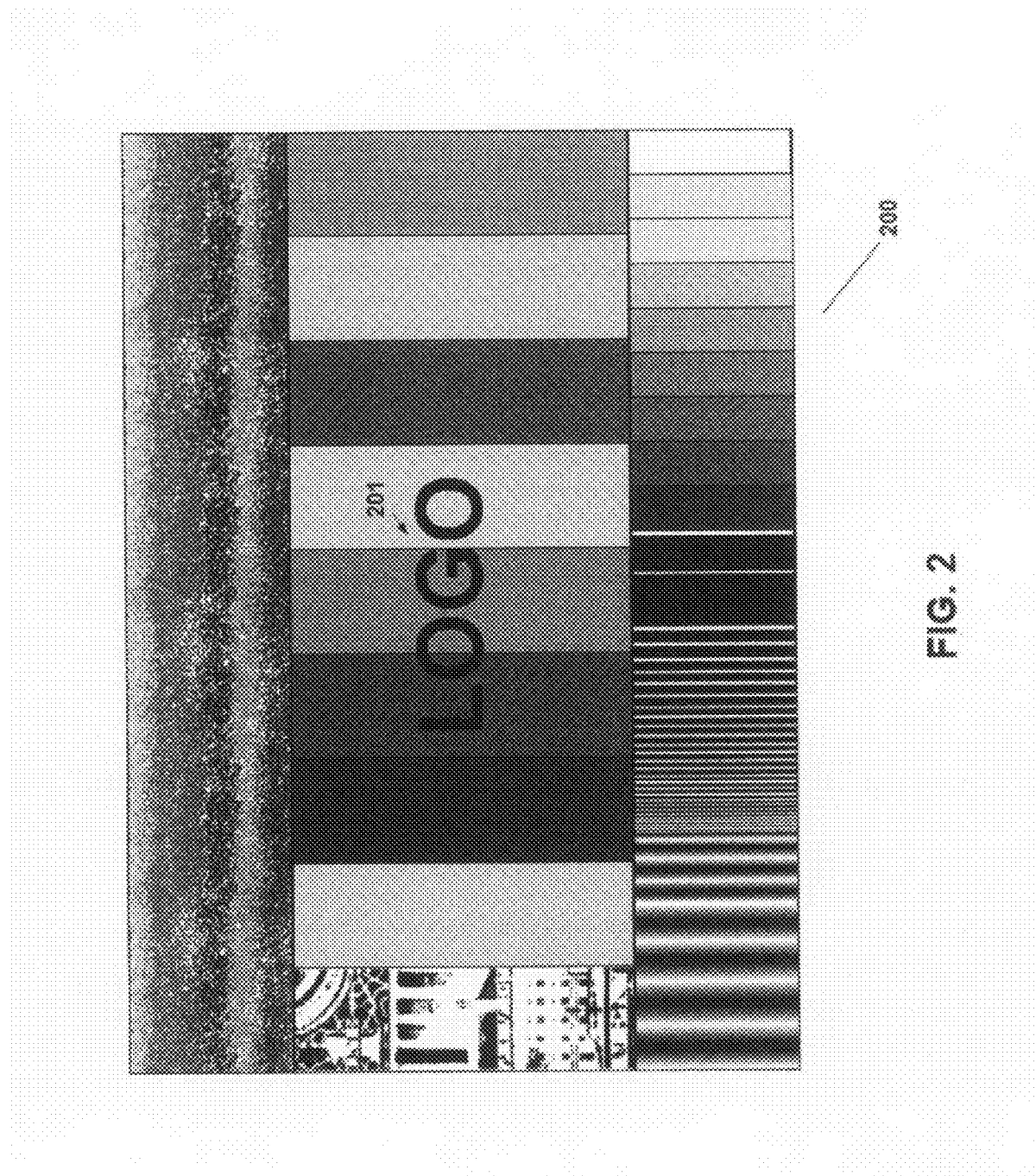
FIG. 2 is the actual graphic in the image evaluation process used as both the reference graphic with advertising and the object graphic with advertising. Both versions are identical. This graphic can be hardcopy, digitized, or televised.

Referring to FIG. 2, the graphic with advertising used in the image evaluation process is presented. According to an alternate preferred embodiment of the present invention, this graphic 200 is identical to the graphic in 100 except this reference graphic/object graphic may contain advertising in a space reserved for such 201, which is placed in such a way as to not compromise its utility as a comparison tool in evaluating images.

Figure 3:
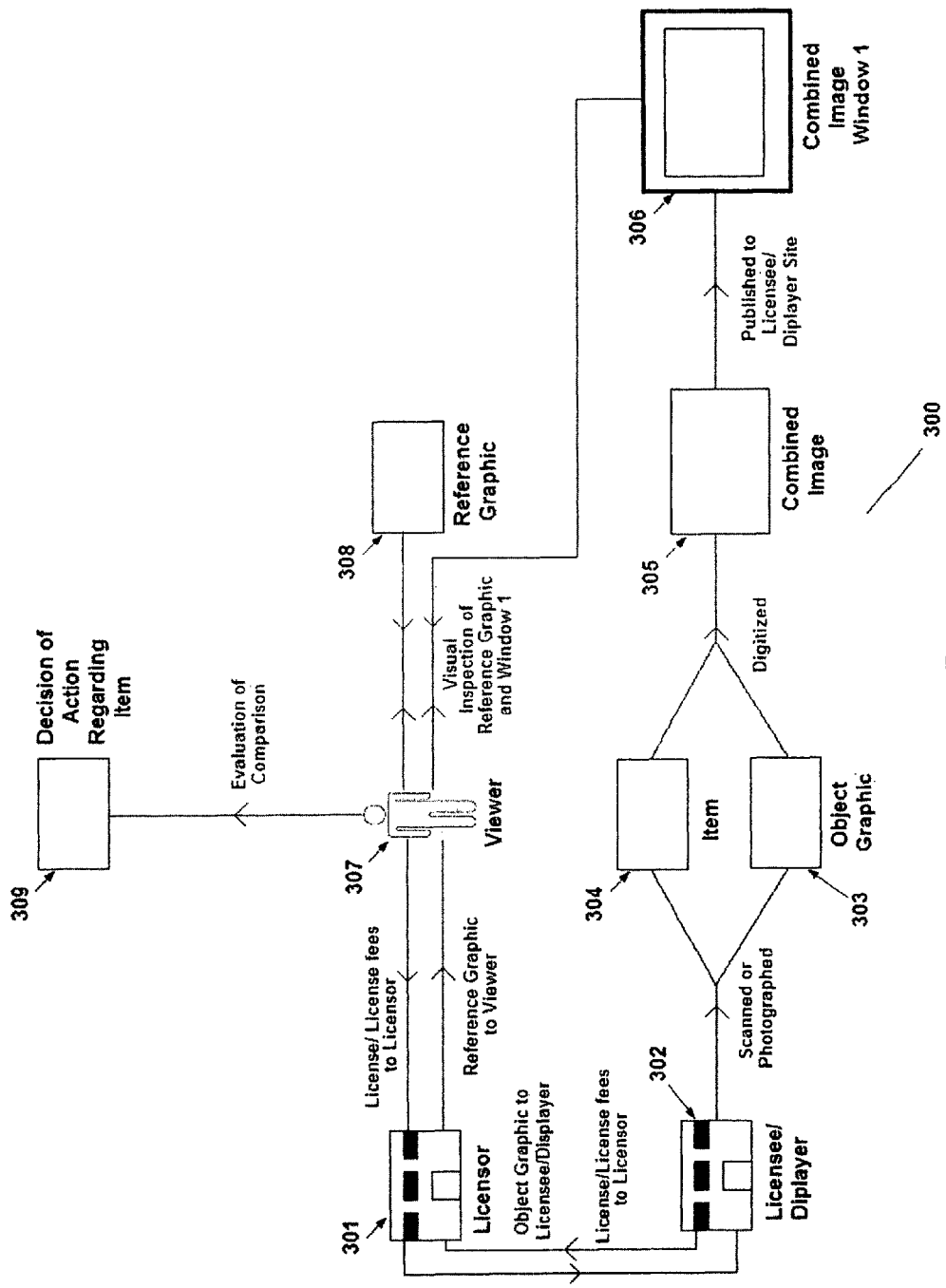
FIG. 3 is a general schematic view illustrating the relationships of the preferred licensing and business relationship of a licensor, displayer of items on the internet, viewer of the image on the internet and the procedure whereby the viewer can evaluate the image of the item displayed on the internet using a hardcopy of the reference graphic that he has licensed from the licensor according to a preferred embodiment of the present invention.

Referring to FIG. 3, a general schematic view is presented illustrating the relationships, according to an alternate preferred embodiment of the present invention, of the preferred licensing and business relationship of a licensor, at least one licensee/displayer of items on the internet, and at least one viewer of images on the internet. According to an alternate preferred embodiment of the present invention, the Method for evaluating images displayed on internet using a hardcopy Reference Graphic 300 preferably permits a Viewer 307 to evaluate the color, clarity and depiction of the image of an item 304 presented for viewing by a Licensee/Displayer 302 for viewing on the internet that the Viewer 307 sees in a window 306 of a personal computer enabling him to make a Decision of Action Regarding the Item 309.

According to an alternate preferred embodiment of the present invention, the Licensor 301 licenses or sells a hardcopy of the Object Graphic 303 to the Licensee/Displayer 302 who scans or photographs the Object Graphic 303 alongside an Item 304 he wishes to display on the internet. A Combined Image 305 is digitized as a result of the photographing or scanning process and the Licensee/Displayer 302 publishes this Combined Image 305 to an internet site which appears to the Viewer 307 in the Combined Image Window 1 306 on a personal computer. The Licensor 301 licenses or sells a hardcopy of the Reference Graphic 308 to the Viewer 307. According to the instructions provided, the Viewer 307, places the hardcopy of the Reference Graphic 308 next to the Combined Image Window 1 306 that appears on the personal computer monitor and the Viewer 307 sees them concurrently. The Viewer 307 is thus able to visually inspect and compare the color, clarity and depiction of the image of the Object Graphic as it appears in the Combined Image Window 1 306 with the color, clarity and depiction of the hardcopy of the Reference Graphic 308 as it appears held up by hand beside the personal computer monitor. To the extent that the color, clarity of the image of the Object Graphic 303 in the Combined Image Window 1 306 matches the color, clarity and depiction of the hardcopy of the Reference Graphic 308 as it appears held up by hand beside the personal computer monitor, the Viewer 307 is able to ascertain the degree to which the color, clarity and depiction of the Item 304 is accurately portrayed in the Combined Image Window 306. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 4:
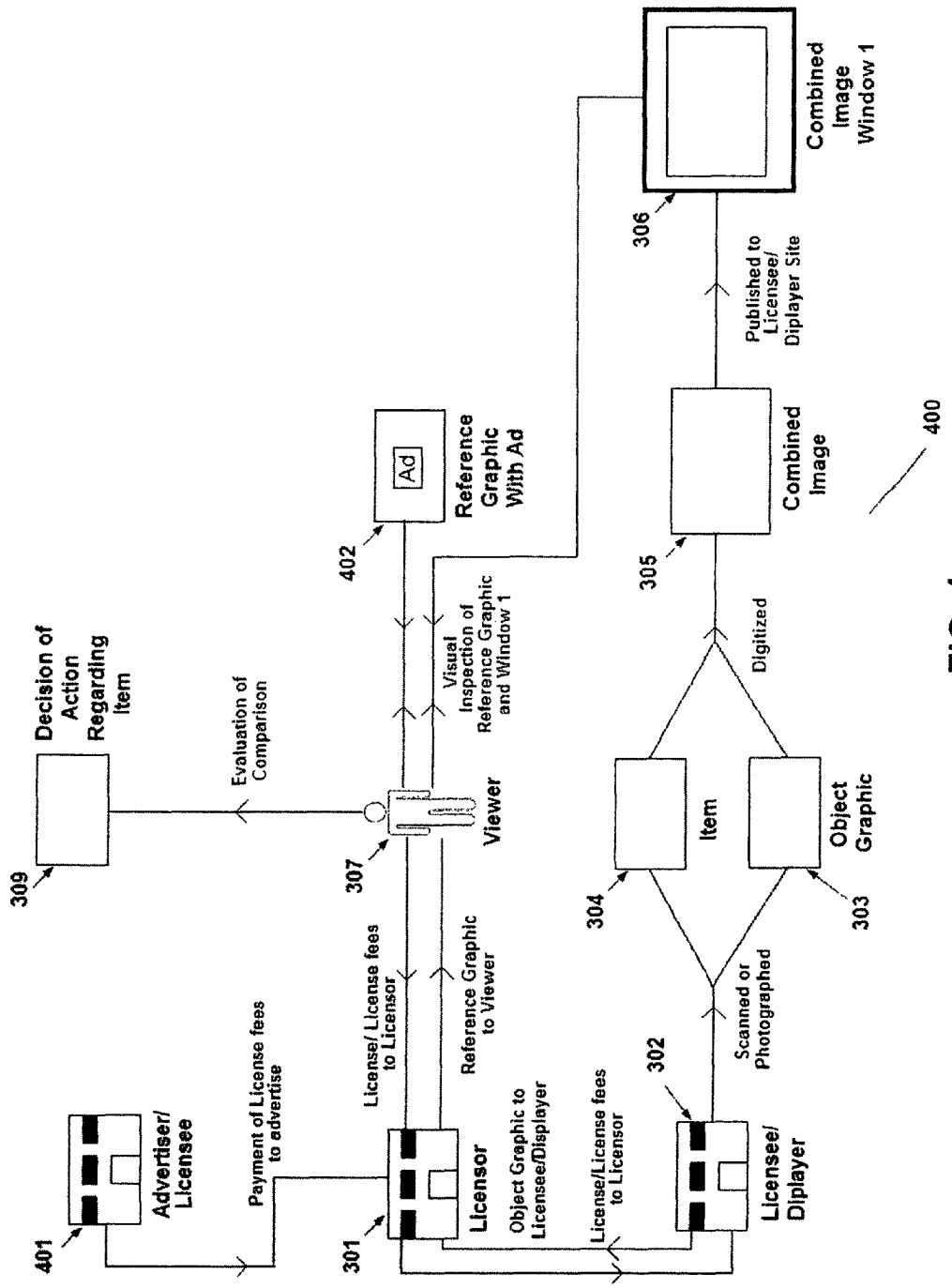
FIG. 4 is a general schematic view illustrating the relationships of the preferred licensing and business relationship of a licensor, advertiser, viewer of images on the internet, and a displayer of images on the internet and the procedure whereby the viewer can evaluate the image of the item displayed on the internet and can view advertising on advertising space, licensed to the advertiser by the licensor, on the hardcopy reference graphic he has licensed from the licensor according to an alternate preferred embodiment of the present invention.

Referring to FIG. 4, a general schematic view is presented illustrating the relationships, according to an alternate preferred embodiment of the present invention, of the preferred licensing and business relationship of a licensor, at least one licensee/displayer of items on the internet, at least one advertiser, and at least one viewer of images on the internet. According to a preferred embodiment of the present invention, the Method for evaluating images displayed on internet, with advertising on the hardcopy of the Reference Graphic 400 preferably permits a Viewer 307 to evaluate the color, clarity and depiction of the image of an item 304 presented by a Licensee/Displayer 302 for viewing on the internet that the Viewer 307 sees in a window 306 of a personal computer enabling him to make a Decision of Action Regarding the Item 309 while simultaneously seeing advertising of an advertiser 401 displayed on a Reference Graphic With Ad 402.

According to an alternate preferred embodiment of the present invention, the Licensor 301 licenses or sells a hard-copy of the Object Graphic 303 to the Licensee/Displayer 302 who scans or photographs the Object Graphic 303 alongside an Item 304 he wishes to display on the internet. A Combined Image 305 of the Item 304 and the Object Graphic 303 is digitized as a result of the photographing or scanning process and the Licensee/Displayer 302 publishes this Combined Image 305 to an internet site which appears to the Viewer 307 in the Combined Image Window 1 306 on a personal computer. Licensor 301 will license or sell the right to place advertising space on the Reference Graphic With Ad 402 to the Advertiser 401. Licensor 301 licenses or sells a Reference Graphic with Ad 402 which includes the advertising space the Advertiser 401 has purchased from the Licensor 301 to the Viewer 307. The Viewer 307 visually inspects and compare the color, clarity and depiction of the image of the Object Graphic 303 as it appears in the Combined Image Window 1 306 with the color, clarity and depiction of the image of the Reference Graphic With Ad 402. To the extent that the color, clarity of the Object Graphic 303 as it appears in the Combined Image Window 1 306 matches the color, clarity and depiction of the Reference Graphic With Ad 402, the Viewer 307 is able to ascertain the degree to which the color, clarity and depiction of the Item 304 is accurately portrayed in the Combined Image Window 306. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 5:
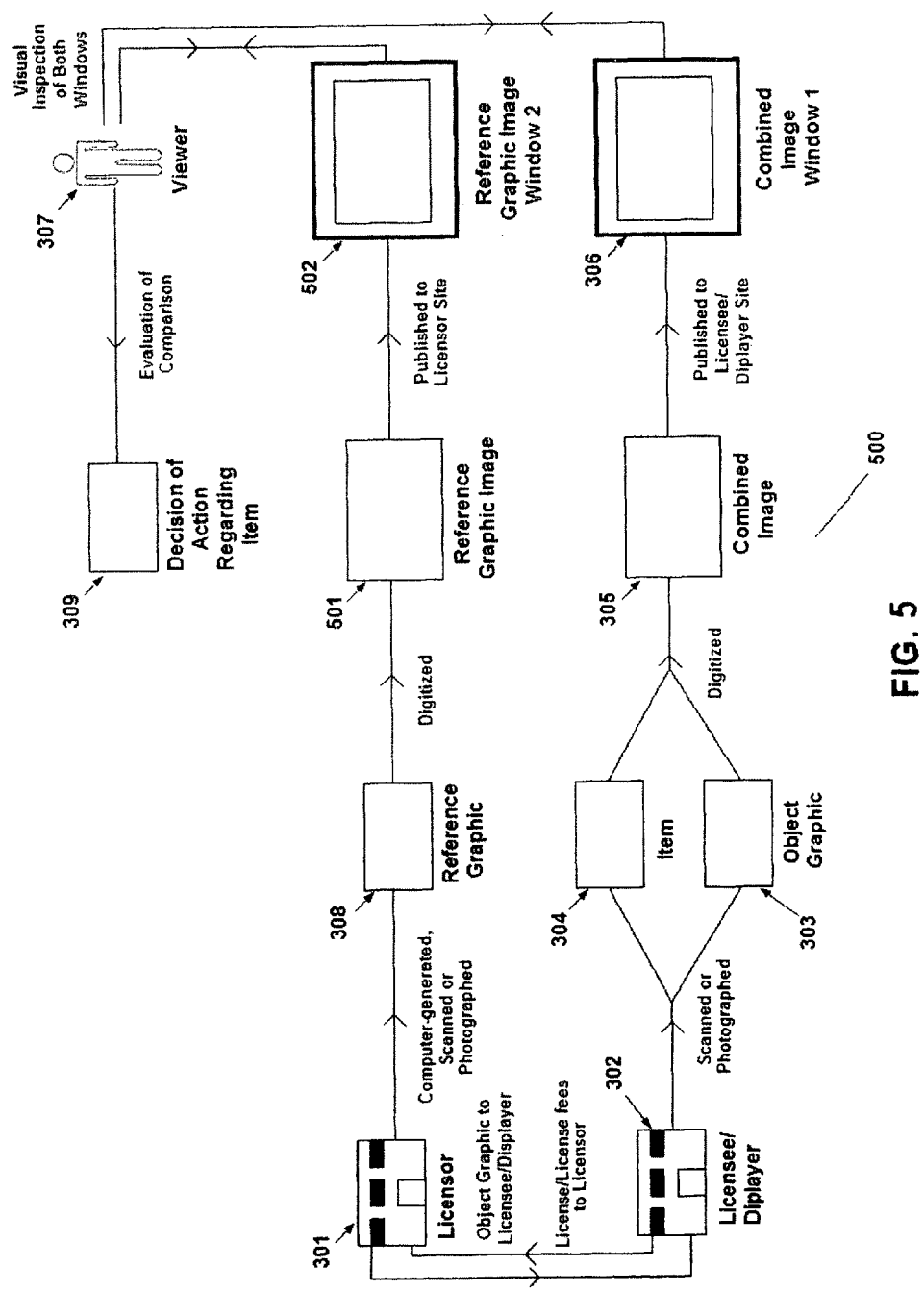
FIG. 5 is a general schematic view illustrating the relationships of the preferred licensing and business relationship of a licensor, displayer of items on the internet, viewer of the image on the internet and the procedure whereby the viewer can evaluate the image of the item displayed on the internet by using a digitized version of the Reference Graphic that appears on the internet according to a preferred embodiment of the present invention.

Referring to FIG. 5, a general schematic view is presented illustrating the relationships, according to a preferred embodiment of the present invention, of the preferred licensing and business relationship of a licensor, at least one licensee/displayer of items on the internet, and at least one viewer of images on the internet. According to a preferred embodiment of the present invention, the Method for evaluating images displayed on internet using a digitized Reference Graphic 500 preferably permits a Viewer 307 to evaluate the color, clarity and depiction of an item 304 presented by a Licensee/Displayer 302 for viewing as an image on the internet that the Viewer 307 sees in a window 306 of a personal computer so that the viewer 307 can make a Decision of Action Regarding the Item 309.

According to a preferred embodiment of the present invention, the Licensor 301 licenses or sells a hardcopy of the Object Graphic 303 to the Licensee/Displayer 302 who scans or photographs the Object Graphic 303 alongside an Item 304 he wishes to display on the internet. A Combined Image 305 of the Item 304 and the Object Graphic 303 is digitized as a result of the photographing or scanning process and the Licensee/Displayer 302 publishes this Combined Image 305 to an internet site which appears to the Viewer 307 in the Combined Image Window 1 306 on a personal computer. The Licensor 301 computer-generates, scans or photographs the Reference Graphic 308 which is identical to the Object Graphic 303 in appearance, color, clarity and depiction (see FIG. 1 and FIG. 2). A Reference Graphic Image 501 is digitized as a result of the computer-generating, scanning or photographing of the Reference Graphic 308 and the Licensor publishes it to the Licensor's internet site, which appears to the Viewer 307 in the Reference Graphic Image Window 2 502 on a personal computer monitor. According to the instructions provided to the Viewer 307, both the Reference Graphic Image Window 2 502 and the Combined Image Window 1 306 are opened concurrently and the Viewer 307 is able to view both windows. The Viewer 307 is thus able to visually inspect and compare the color, clarity and depiction of the image of the Object Graphic 303 as it appears in the Combined Image Window 1 306 with the color, clarity and depiction of the image of the Reference Graphic 308 as it appears in the Reference Graphic Image Window 2 502. To the extent that the color, clarity of the Object Graphic 303 as it appears in the Combined Image Window 1 306 matches the color, clarity and depiction of the Reference Graphic 308 as it appears in the Reference Graphic Image Window 2 502, the Viewer 307 is able to ascertain the degree to which the color, clarity and depiction of the Item 304 is accurately portrayed in the Combined Image Window 306. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 6:
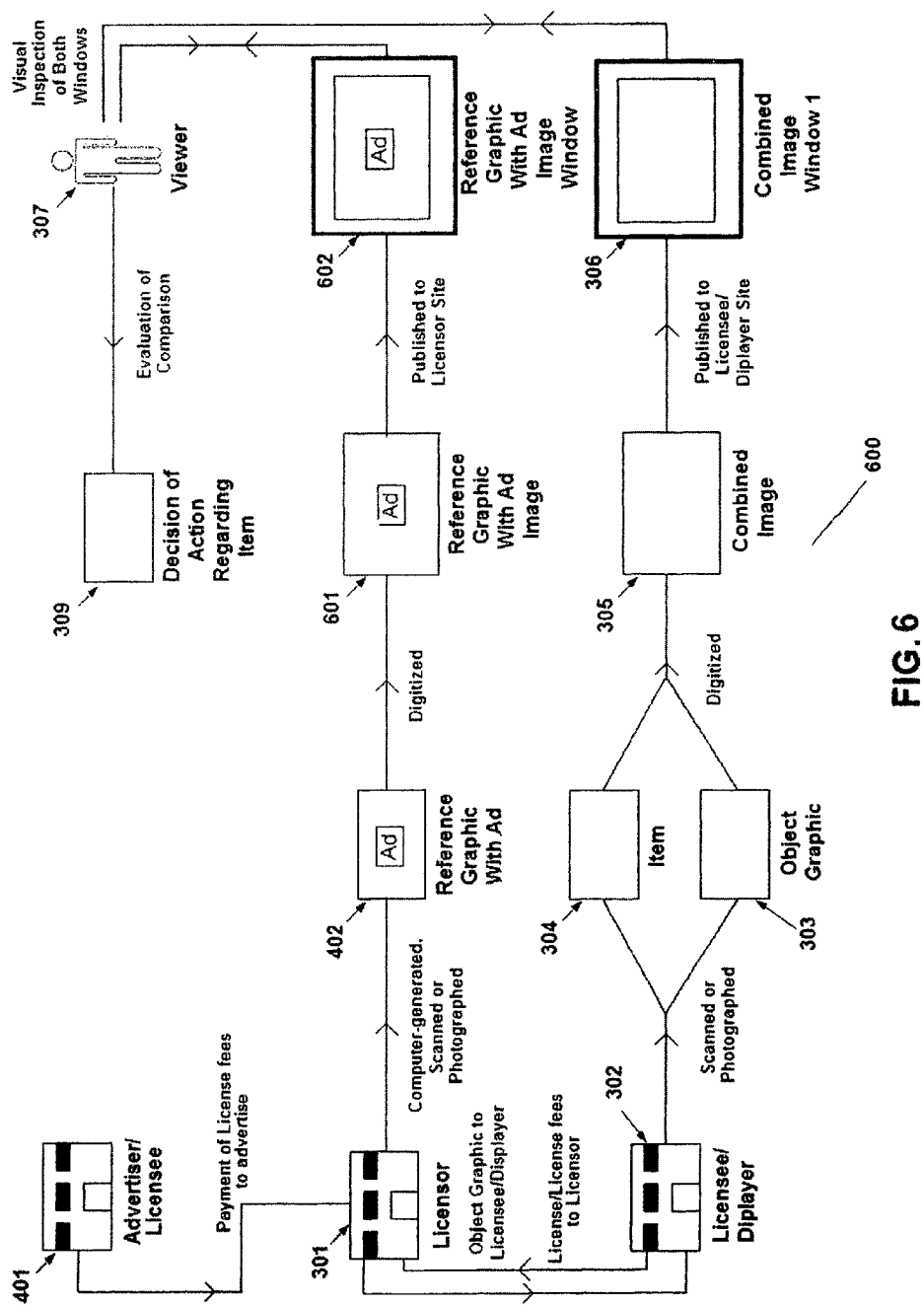
FIG. 6 is a general schematic view illustrating the relationships of the preferred licensing and business relationship of a licensor, displayer of items on the internet, advertiser, viewer of images on the internet and the procedure whereby the viewer can evaluate the image of the item displayed on the internet by using a digitized version of the Reference Graphic that appears on the internet while viewing advertising according to an alternate preferred embodiment of the present invention.

Referring to FIG. 6, a general schematic view is presented illustrating the relationships, according to an alternate preferred embodiment of the present invention, of the preferred licensing and business relationship of a licensor, at least one licensee/displayer of items on the internet, at least one advertiser, and at least one viewer of images on the internet. According to a preferred embodiment of the present invention, the Method for evaluating images displayed on internet using a digitized Reference Graphic with advertising 600 preferably permits a Viewer 307 to evaluate the color, clarity and depiction of the image of an item 304 presented by a Licensee/Displayer 302 for viewing on the internet that the Viewer 307 sees in a window 306 of a personal computer enabling him to make a Decision of Action Regarding the Item 309 while simultaneously seeing advertising of an advertiser 401.

According to an alternate preferred embodiment of the present invention, the Licensor 301 licenses or sells a hardcopy of the Object Graphic 303 to the Licensee/Displayer 302 who scans or photographs the Object Graphic 303 alongside an Item 304 he wishes to display on the internet. A Combined Image 305 of the Item 304 and the Object Graphic 303 is digitized as a result of the photographing or scanning process and the Licensee/Displayer 302 publishes this Combined Image 305 to an internet site which appears to the Viewer 307 in the Combined Image Window 1 306 on a personal computer. Licensor 301 licenses or sells advertising space on the reference graphic to the Advertiser 401. Licensor 301 computer-generates, scans or photographs the Reference Graphic with Ad 402 which includes the advertising space the Advertiser 401 has licensed or purchased from the Licensor 301. A Reference Graphic with Ad Image 601 is digitized as a result of the computer-generating, scanning or photographing of the Reference Graphic with Ad 402 and the Licensor publishes it to the Licensor's internet site, which appears to the Viewer 307 in the Reference Graphic with Ad Image Window 602 on a personal computer. According to the instructions provided to the Viewer 307, both the Reference Graphic with Ad Image Window 602 and the Combined Image Window 1 306 are opened concurrently and the Viewer 307 sees both windows. The Viewer 307 is thus able to visually inspect and compare the color, clarity and depiction of the image of the Object Graphic 303 as it appears in the Combined Image Window 1 306 with the color, clarity and depiction of the image of the Reference Graphic with Ad 402 as it appears in the Reference Graphic With Ad Image Window 602. To the extent that the color, clarity of the Object Graphic 303 as it appears in the Combined Image Window 1 306 matches the color, clarity and depiction of Reference Graphic with Ad 402 as it appears in the Reference Graphic With Ad Image Window 602, the Viewer 307 is able to ascertain the degree to which the color, clarity and depiction of the Item 304 is accurately portrayed in the Combined Image Window 306. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 7:
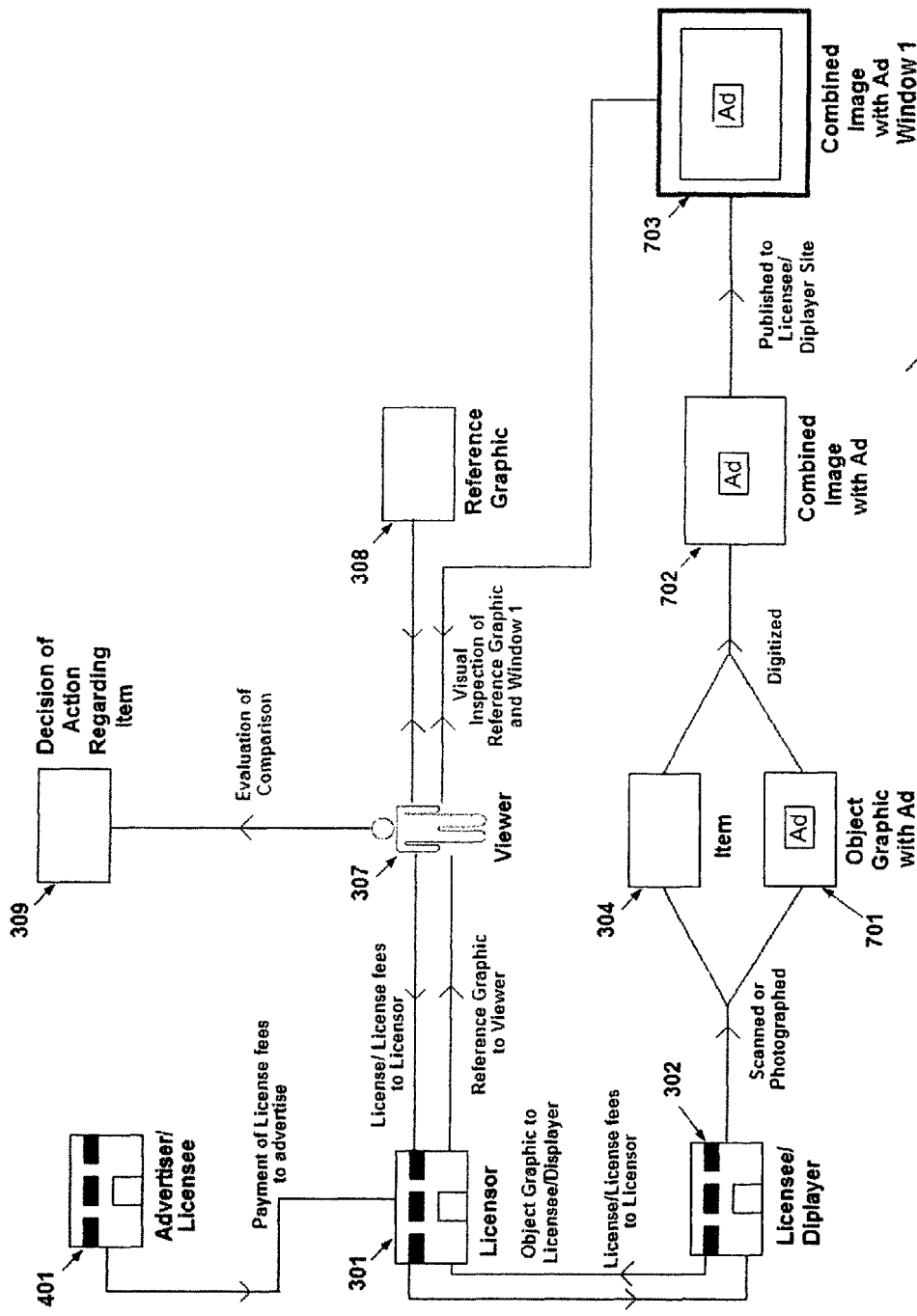
FIG. 7 is a general schematic view illustrating the relationships of the preferred licensing and business relationship of a licensor, advertiser, viewer of images on the internet, and a displayer of images on the internet and the procedure whereby the viewer can evaluate the image of an item displayed on the internet while viewing advertising on the object graphic appearing on the displayer's internet site according to an alternate preferred embodiment of the present invention.

Referring to FIG. 7, a general schematic view is presented illustrating the relationships, according to an alternate preferred embodiment of the present invention, of the preferred licensing and business relationship of a licensor, at least one licensee/displayer of items on the internet, at least one advertiser, and at least one viewer of images on the internet. According to a preferred embodiment of the present invention, the Method for evaluating images displayed on internet, with advertising on the Object Graphic 700 preferably permits a Viewer 307 to evaluate the color, clarity and depiction of the image of an item 304 presented by a Licensee/Displayer 302 for viewing on the internet that the Viewer 307 sees in a window 703 of a personal computer enabling him to make a Decision of Action Regarding the Item 309 while simultaneously seeing advertising of an advertiser 401 displayed on an Object Graphic With Ad 701.

According to an alternate preferred embodiment of the present invention, the Licensor 301 licenses or sells advertising space on the Object Graphic With Ad 701 to the Advertiser 401. Licensor 301 licenses or sells the Object Graphic With Ad 701 to the Licensee/Displayer 302. Licensee/Displayer 302 scans or photographs the Object Graphic With Ad 701 alongside an Item 304 he wishes to display on the internet. A Combined Image With Ad 702 is digitized as a result of the photographing or scanning process and the Licensee/Displayer 302 publishes this Combined Image With Ad 702 to an internet site which appears to the Viewer 307 in the Combined Image With Ad Window 1 703 on a personal computer. The Licensor 301 licenses or sells a hardcopy of the Reference Graphic 308 to the Viewer 307. According to the instructions provided, the Viewer 307, places the hardcopy of the Reference Graphic 308 next to the Combined Image With Ad Window 1 703 that appears on the personal computer monitor and the Viewer 307 sees them concurrently. The Viewer 307 visually inspects and compare the color, clarity and depiction of the image of the Object Graphic With Ad 701 as it appears in the Combined Image With Ad Window 1 703 with the color, clarity and depiction of the image of the Reference Graphic 308. To the extent that the color, clarity of the Object Graphic With Ad 701 as it appears in the Combined Image With Ad Window 1 703 matches the color, clarity and depiction of the Reference Graphic 308, the Viewer 307 is able to ascertain the degree to which the color, clarity and depiction of the Item 304 is accurately portrayed in the Combined Image With Ad Window 1 703. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 8:
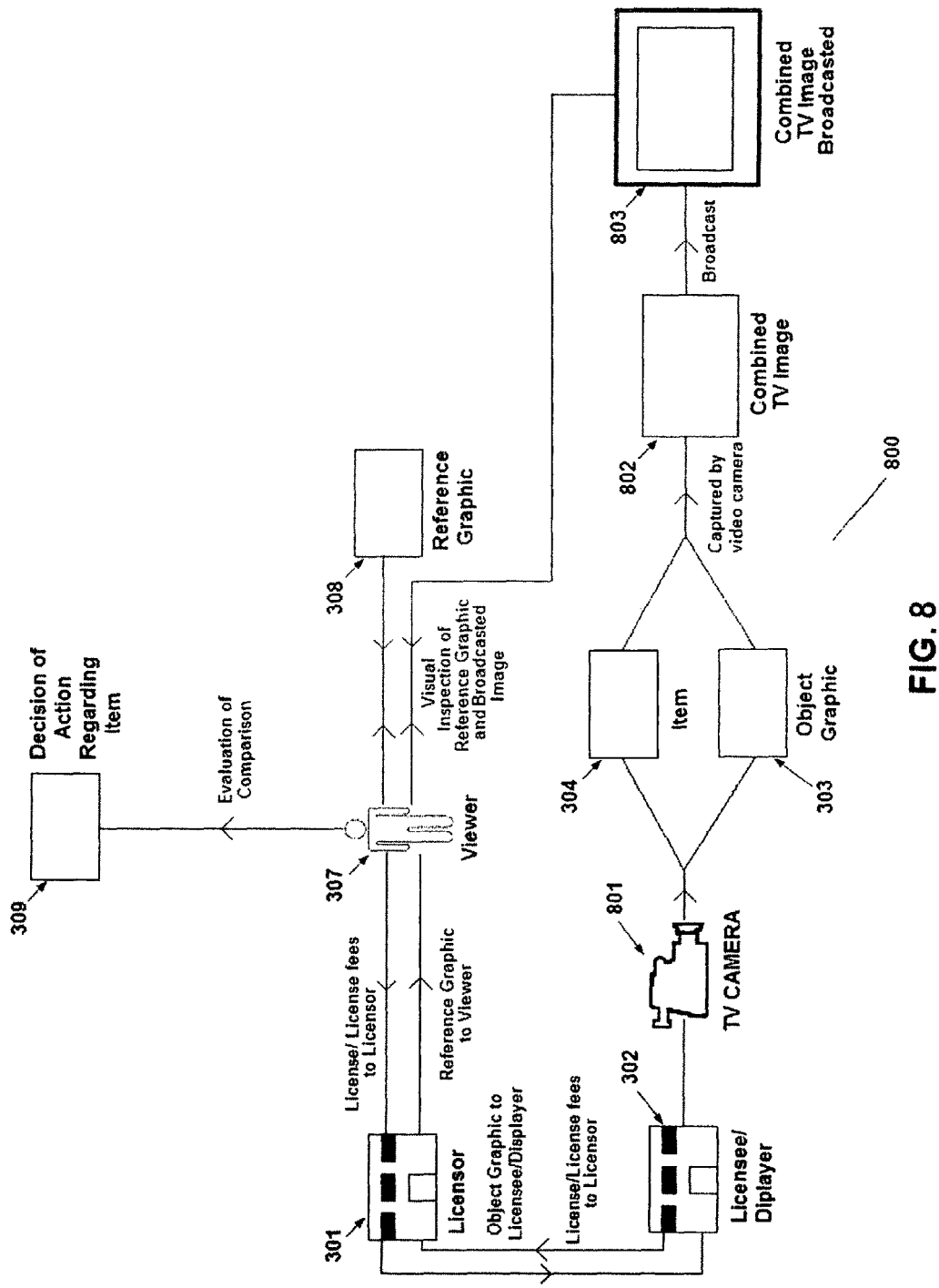
FIG. 8 is a general schematic view illustrating the relationships of the preferred licensing and business relationship of a licensor, displayer of items on broadcast television, viewer of images on broadcast television and the procedure whereby the viewer can evaluate the image of an item displayed on the television screen according to an alternate preferred embodiment of the present invention.

Referring to FIG. 8, a general schematic view is presented illustrating the relationships, according to an alternate preferred embodiment of the present invention, of the preferred licensing and business relationship of a licensor, at least one licensee/displayer of items on television, and at least one viewer of images on television. According to a preferred embodiment of the present invention, the Method for evaluating images displayed on internet as it relates to evaluating images on broadcast television 800 preferably permits a Viewer 307 to evaluate the color, clarity and depiction of an item 304 presented by a Licensee/Displayer 302 for viewing as an image on television that the Viewer 307 sees in a Combined TV Image Broadcast 803 on television so that the Viewer 307 can make a Decision of Action Regarding the Item 309.

According to a preferred embodiment of the present invention, the Licensor 301 licenses or sells a hardcopy of the Object Graphic 303 to the Licensee/Displayer 302 who uses a TV Camera 801 to video-film the Object Graphic 303 alongside an Item 304 he wishes to display on television. A Combined TV Image 802 of the Item 304 and the Object Graphic 303 is broadcast as a result of the video-filming resulting in the Combined TV Image Broadcasted 803 which appears to the Viewer 307 in on his television.

The Licensor 301 licenses or sells a hardcopy of the Reference Graphic 308 to the Viewer 307. The Viewer 307 views the Combined TV Image Broadcasted 803 and the Reference Graphic 308 simultaneously and is thus able to visually inspect and compare the color, clarity and depiction of the image of the Object Graphic 303 as it appears on his television with the color, clarity and depiction of the Reference Graphic 308. To the extent that the color, clarity and depiction of the Object Graphic 303 matches the color, clarity and depiction of the Reference Graphic 308, the Viewer 307 is able to ascertain the degree to which the color, clarity and depiction of the Item 304 is accurately portrayed in the Combined TV Image Broadcasted 803. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 9:
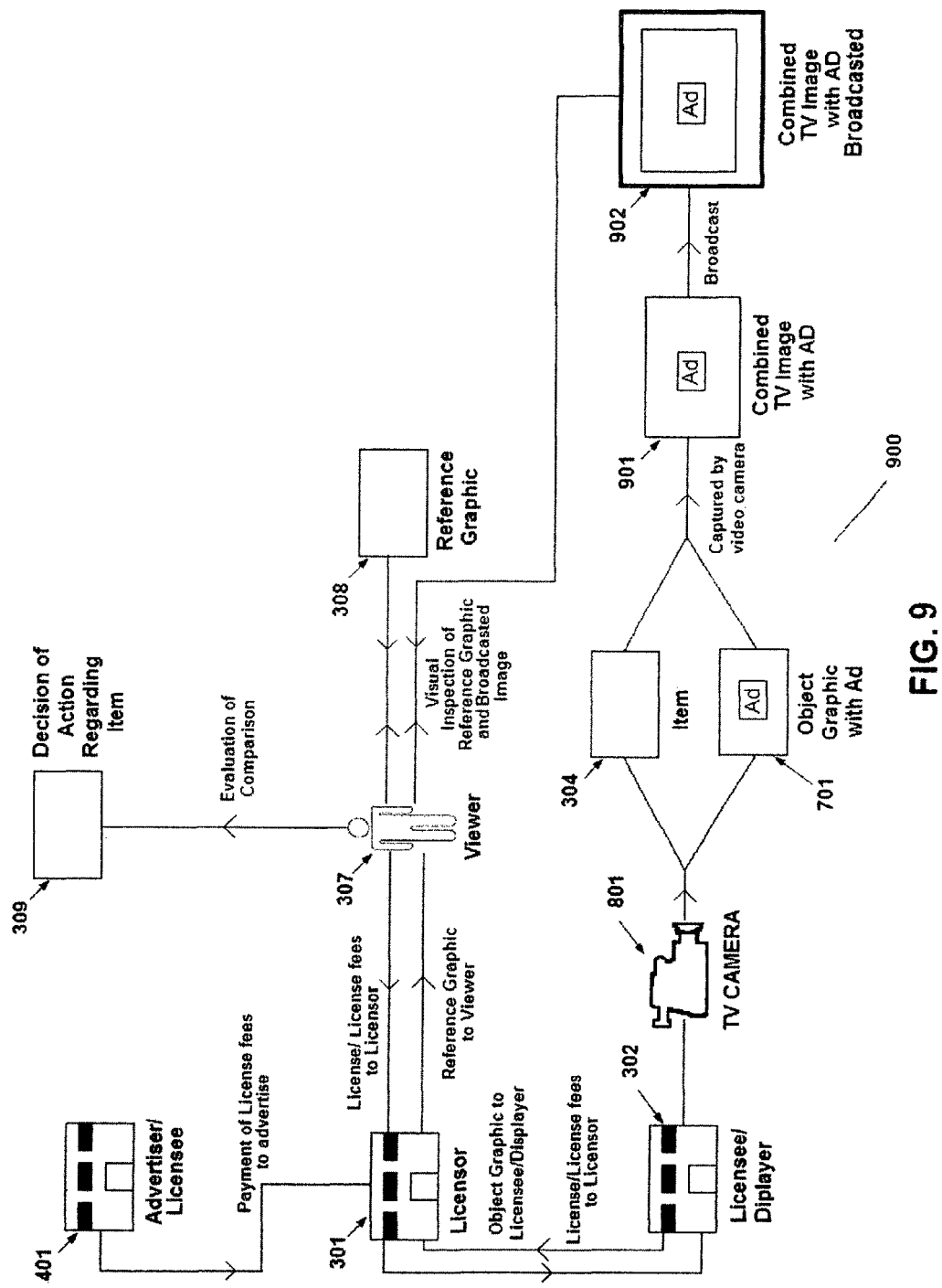
FIG. 9 is a general schematic view illustrating the relationships of the preferred licensing and business relationship of a licensor, displayer of items on broadcast television, advertiser, and viewer of images on broadcast television and the procedure whereby the viewer can evaluate the image of an item displayed on the television screen while viewing advertising, space on which it appears that has been licensed to the advertiser by the licensor, according to an alternate preferred embodiment of the present invention.

Referring to FIG. 9, a general schematic view is presented illustrating the relationships, according to an alternate preferred embodiment of the present invention, of the preferred licensing and business relationship of a licensor, at least one advertiser, at least one licensee/displayer of items on television, and at least one viewer of images on television. According to a preferred embodiment of the present invention, the Method for evaluating images displayed on internet as it relates to evaluating images on broadcast television, with advertising 900 preferably permits a Viewer 307 to evaluate the color, clarity and depiction of an item 304 presented by a Licensee/Displayer 302 for viewing as an image on television that the Viewer 307 sees in a Combined TV Image With Ad Broadcasted 902 on television so that the Viewer 307 can make a Decision of Action Regarding the Item 309.

According to a preferred embodiment of the present invention, Licensor 301 licenses or sells advertising space on the object graphic to the Advertiser 401. The Licensor 301 licenses or sells a hardcopy of the Object Graphic With Ad 701 to the Licensee/Displayer 302 who uses a TV Camera 801 to video-film the Object Graphic With Ad 701 alongside an Item 304 he wishes to display on television. A Combined TV Image With Ad 901 is broadcast as a result of the video-filming resulting in the Combined TV Image With Ad Broadcasted 902 which appears to the Viewer 307 in on his television.

The Licensor 301 licenses or sells a hardcopy of the Reference Graphic 308 to the Viewer 307 which is identical to the Object Graphic With Ad 701 in appearance, color, clarity and depiction except for the portion reserved for advertising space. The Viewer 307 views the Combined TV Image With Ad Broadcasted 902 and the Reference Graphic 308 simultaneously and is thus able to visually inspect and compare the color, clarity and depiction of the image of the Object Graphic With Ad 701 as it appears on his television with the color, clarity and depiction of the Reference Graphic 308. To the extent that the color, clarity and depiction of the Object Graphic With Ad 701 matches the color, clarity and depiction of the Reference Graphic 308, the Viewer 307 is able to ascertain the degree to which the color, clarity and depiction of the Item 304 is accurately portrayed. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 10:
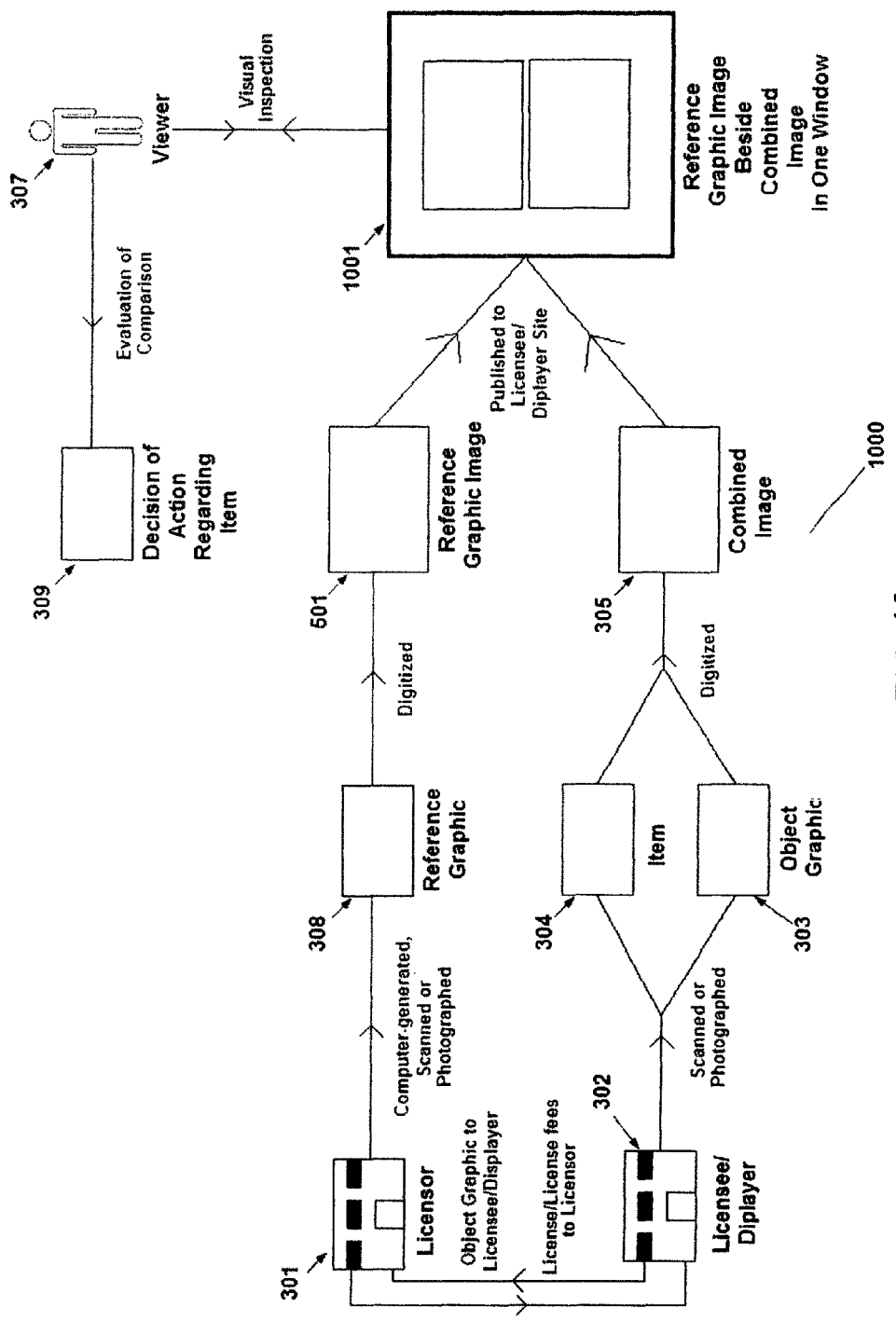
FIG. 10 is a general schematic view illustrating the relationships of the preferred licensing and business relationship of a licensor, displayer of items on the internet, viewer of images on the internet and the procedure whereby the viewer can evaluate the image of an item displayed on the internet by examining the reference image in the same window in which both the item and the object image appear in according to an alternate preferred embodiment of the present invention.

Referring to FIG. 10, a general schematic view is presented illustrating the relationships, according to an alternate preferred embodiment of the present invention, of the preferred licensing and business relationship of a licensor, at least one licensee/displayer of items on the internet, and at least one viewer of images on the internet. According to an alternate preferred embodiment of the present invention, the Method for evaluating images displayed on internet using one internet window for viewing both the digitized Reference Graphic and the Item 1000 preferably permits a Viewer 307 to evaluate the color, clarity and depiction of the image of an item 304 presented for viewing on the internet by a Licensee/Displayer 302 that the Viewer 307 sees in a Reference Graphic Image Beside Combined Image in One Window 1001 appearing on the monitor of a personal computer enabling him to make a Decision of Action Regarding the Item 309.

According to an alternate preferred embodiment of the present invention, the Licensor 301 licenses or sells a hardcopy of the Object Graphic 303 to the Licensee/Displayer 302 who scans or photographs the Object Graphic 303 alongside an Item 304 he wishes to display on the internet. A Combined Image 305 of the Item 304 and the Object Graphic 303 is digitized as a result of the photographing or scanning process and the Licensee/Displayer 302 publishes this Combined Image 305 to an internet site which appears to the Viewer 307 in the Reference Graphic Image Beside Combined Image in One Window 1001 on the monitor of a personal computer. The Licensor 301 computer-generates, scans or photographs the Reference Graphic 308 which is identical to the Object Graphic 303. A Reference Graphic Image 501 is digitized as a result of the computer-generating, scanning or photographing of the Reference Graphic 308 and the Licensor publishes it to the same site where the Licensee/Displayer 302 published the Combined Image 305, and both the Reference Graphic Image 501 and the Combined Image 305 appear beside each other in the Reference Graphic Image Beside Combined Image in One Window 1001 which appears to the Viewer 307 on the monitor of a personal computer. According to the instructions provided, the Viewer 307 visually inspects and compare the color, clarity and depiction of the image of the Object Graphic 303 part of the Combined Image 305 with the color, clarity and depiction of the image of the Reference Graphic 308 part as they appear in the window together. To the extent that the color, clarity and depiction of the Object Graphic 303 matches the color, clarity and depiction of the Reference Graphic 308 as they appear in the window together, the Viewer 307 is able to ascertain the degree to which the color, clarity and depiction of the Item 304 is accurately portrayed in the same window. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 11:
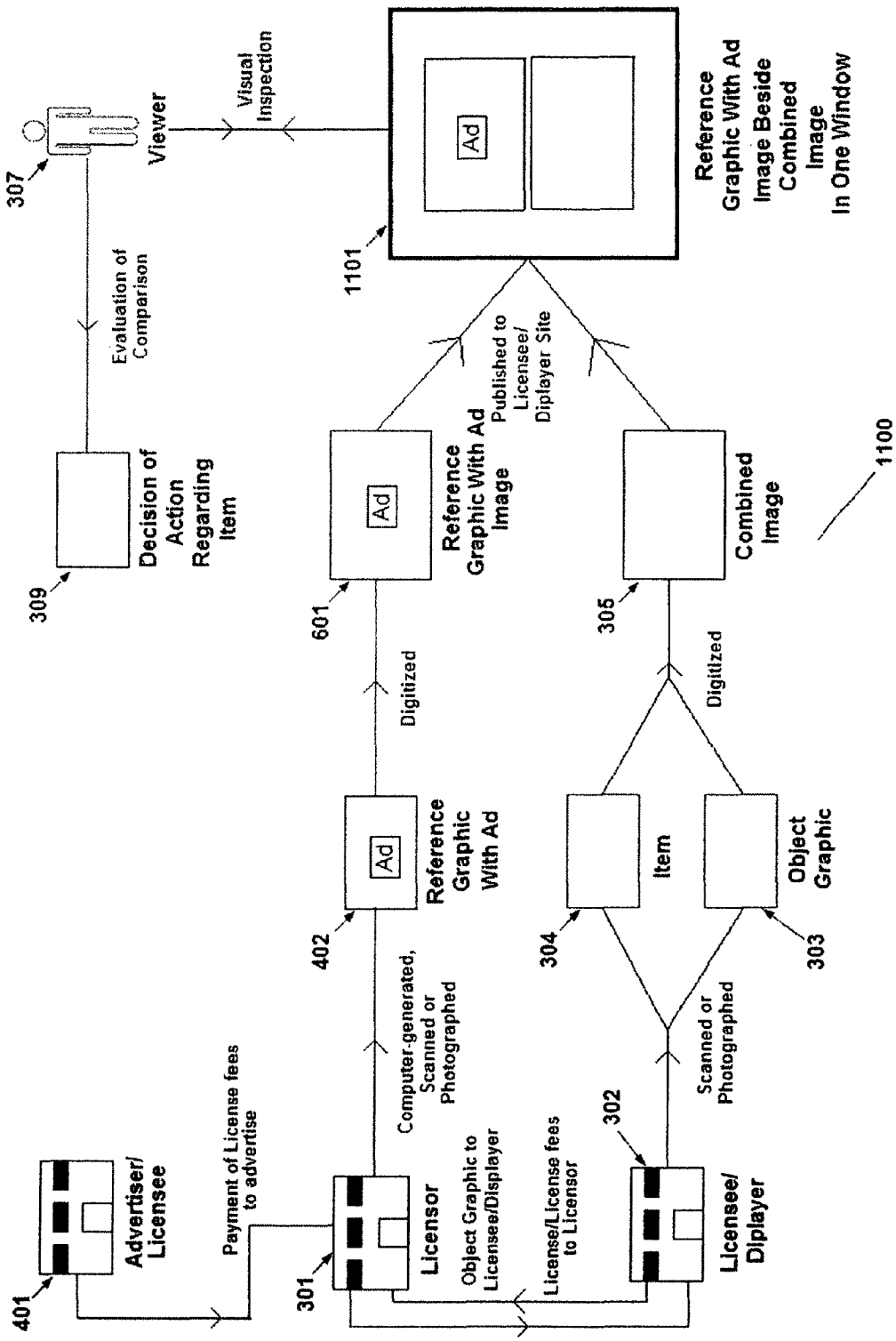
FIG. 11 is a general schematic view illustrating the relationships of the preferred licensing and business relationship of a licensor, displayer of items on the internet, advertiser, viewer of images on the internet and the procedure whereby the viewer can evaluate the image of items displayed on the internet by examining the reference image with advertising in the same window in which both the item and the object image appear in according to an alternate preferred embodiment of the present invention.

Referring to FIG. 11, a general schematic view is presented illustrating the relationships, according to an alternate preferred embodiment of the present invention, of the preferred licensing and business relationship of a licensor, at least one licensee/displayer of items on the internet, at least one advertiser and at least one viewer of images on the internet. According to an alternate preferred embodiment of the present invention, the Method for evaluating images displayed on the internet using one internet window for viewing both the digitized Reference Graphic and the Item, including advertising 1100 preferably permits a Viewer 307 to evaluate the color, clarity and depiction of the image of an item 304 presented for viewing on the internet by a Licensee/Displayer 302 that the Viewer 307 sees in a Reference Graphic With Ad Image Beside Combined Image in One Window 1101 appearing on the monitor of a personal computer enabling him to make a Decision of Action Regarding the Item 309.

According to an alternate preferred embodiment of the present invention, the Licensor 301 licenses or sells a hardcopy of the Object Graphic 303 to the Licensee/Displayer 302 who scans or photographs the Object Graphic 303 alongside an Item 304 he wishes to display on the internet. A Combined Image 305 of the Item 304 and the Object Graphic 303 is digitized as a result of the photographing or scanning process and the Licensee/Displayer 302 publishes this Combined Image 305 to an internet site which appears to the Viewer 307 in the Reference Graphic with Ad Image Beside Combined Image in One Window 1101 on the monitor of a personal computer. Licensor 301 licenses or sells advertising space on the Reference Graphic to the Advertiser 401. The Licensor 301 computer-generates, scans or photographs the Reference Graphic With Ad 402. A Reference Graphic With Ad Image 601 is digitized as a result of the computer-generating, scanning or photographing and the Licensor publishes it to the same site where the Licensee/Displayer 302 published the Combined Image 305, and both the Reference Graphic with Ad Image 601 and the Combined Image 305 appear beside each other in the Reference Graphic With Ad Image Beside Combined Image in One Window 1101 which appears to the Viewer 307 on the monitor of a personal computer. The Viewer 307 visually inspects and compare the color, clarity and depiction of the image of the Object Graphic 303 part with the color, clarity and depiction of the image of the Reference Graphic With Ad 402 part as they appear in the window together. To the extent that the color, clarity of the Object Graphic 303 matches the color, clarity and depiction of the Reference Graphic With Ad 308 part, the Viewer 307 is able to ascertain the degree to which the color, clarity and depiction of the Item 304 is accurately portrayed. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 12:
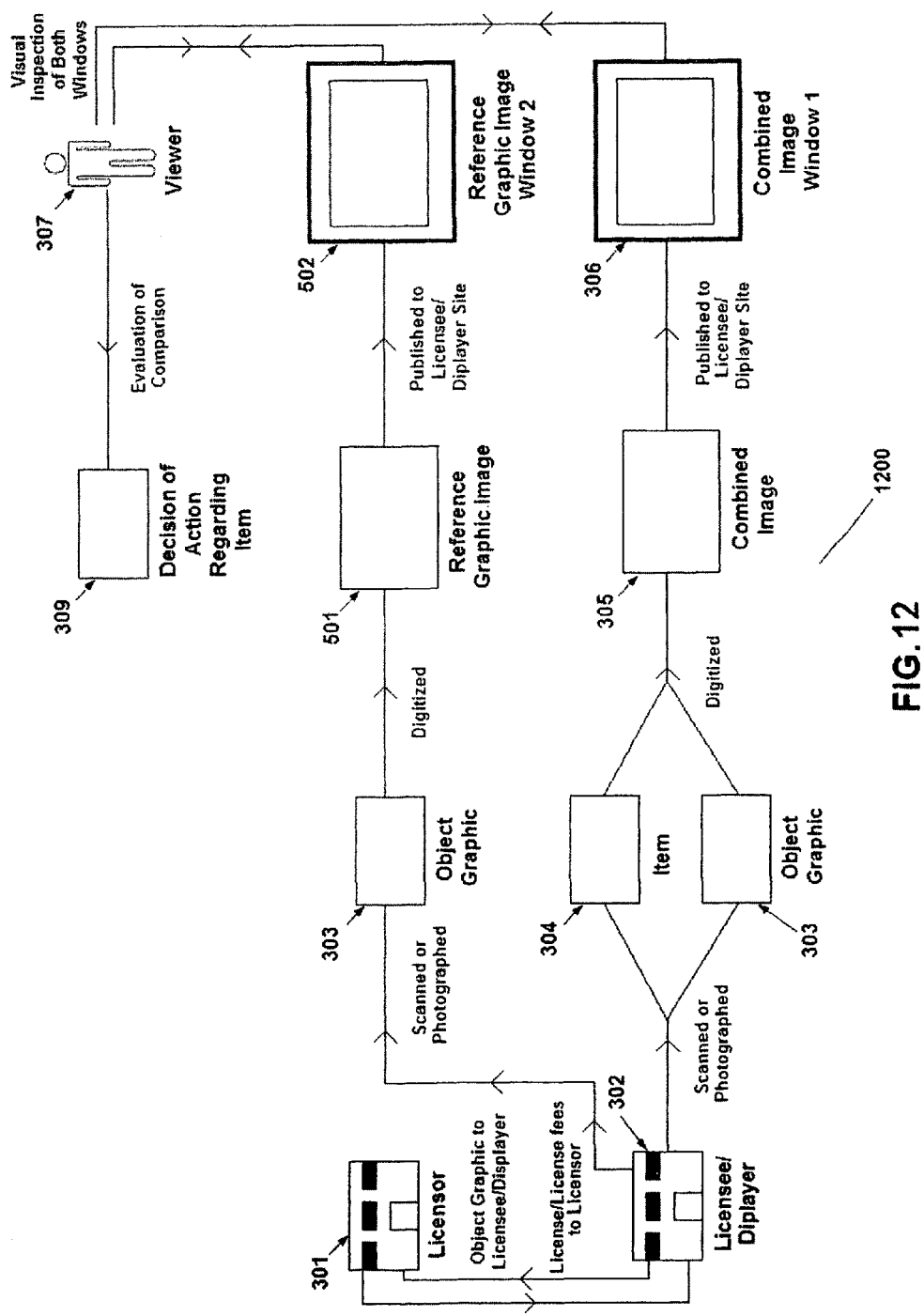
FIG. 12 is a general schematic view illustrating the relationships of the preferred licensing and business relationship of a licensor, displayer of items on the internet, viewer of images on the internet and the procedure whereby the viewer can evaluate the image of items displayed on the internet by viewing the reference graphic on the displayer's website according to an alternate preferred embodiment of the present invention.

Referring to FIG. 12, a general schematic view is presented illustrating the relationships, according to an alternate preferred embodiment of the present invention, of the preferred licensing and business relationship of a licensor, at least one licensee/displayer of items on the internet, and at least one viewer of images on the internet. According to an alternate preferred embodiment of the present invention, the Method for evaluating images displayed on internet using a digitized reference graphic image supplied by the licensee/displayer and published to his own internet site 1200 preferably permits a Viewer 307 to evaluate the color, clarity and depiction of the image of an item 304 presented for viewing on the internet by a Licensee/Displayer 302 that the Viewer 307 sees in a Combined Image Window 1 306 of a personal computer enabling him to make a Decision of Action Regarding the Item 309.

According to an alternate preferred embodiment of the present invention, the Licensor 301 licenses or sells a hardcopy of the Object Graphic 303 to the Licensee/Displayer 302 who scans or photographs the Object Graphic 303 alongside an Item 304 he wishes to display on the internet. A Combined Image 305 of the Item 304 and the Object Graphic 303 is digitized as a result of the photographing or scanning process and the Licensee/Displayer 302 publishes this Combined Image 305 to an internet site which appears to the Viewer 307 in the Combined Image Window 1 306 on a personal computer. The Licensee/Displayer scans or photographs the Object Graphic 303 which is identical to the Reference Graphic. A Reference Graphic Image 501 is digitized as a result of the scanning or photographing of the Object Graphic 303 and the Licensee/Displayer publishes it to the Licensee/Displayer's internet site, which appears to the Viewer 307 in the Reference Graphic Image Window 2 502 on a personal computer monitor. Both the Reference Graphic Image Window 2 502 and the Combined Image Window 1 306 are opened concurrently and the Viewer 307 sees both windows. The Viewer 307 is thus able to visually inspect and compare the color, clarity and depiction of the image of the Object Graphic 303 as it appears in the Combined Image Window 1 306 with the color, clarity and depiction of the image of the Reference Graphic Image 501 as it appears in the Reference Graphic Image Window 2 502. To the extent that the color, clarity of the Object Graphic 303 as it appears in the Combined Image Window 1 306 matches the color, clarity and depiction of the Reference Graphic Image 501 as it appears in the Reference Graphic Image Window 2 502, the Viewer 307 is able to ascertain the degree to which the color, clarity and depiction of the Item 304 is accurately portrayed in the Combined Image Window 306. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 13:
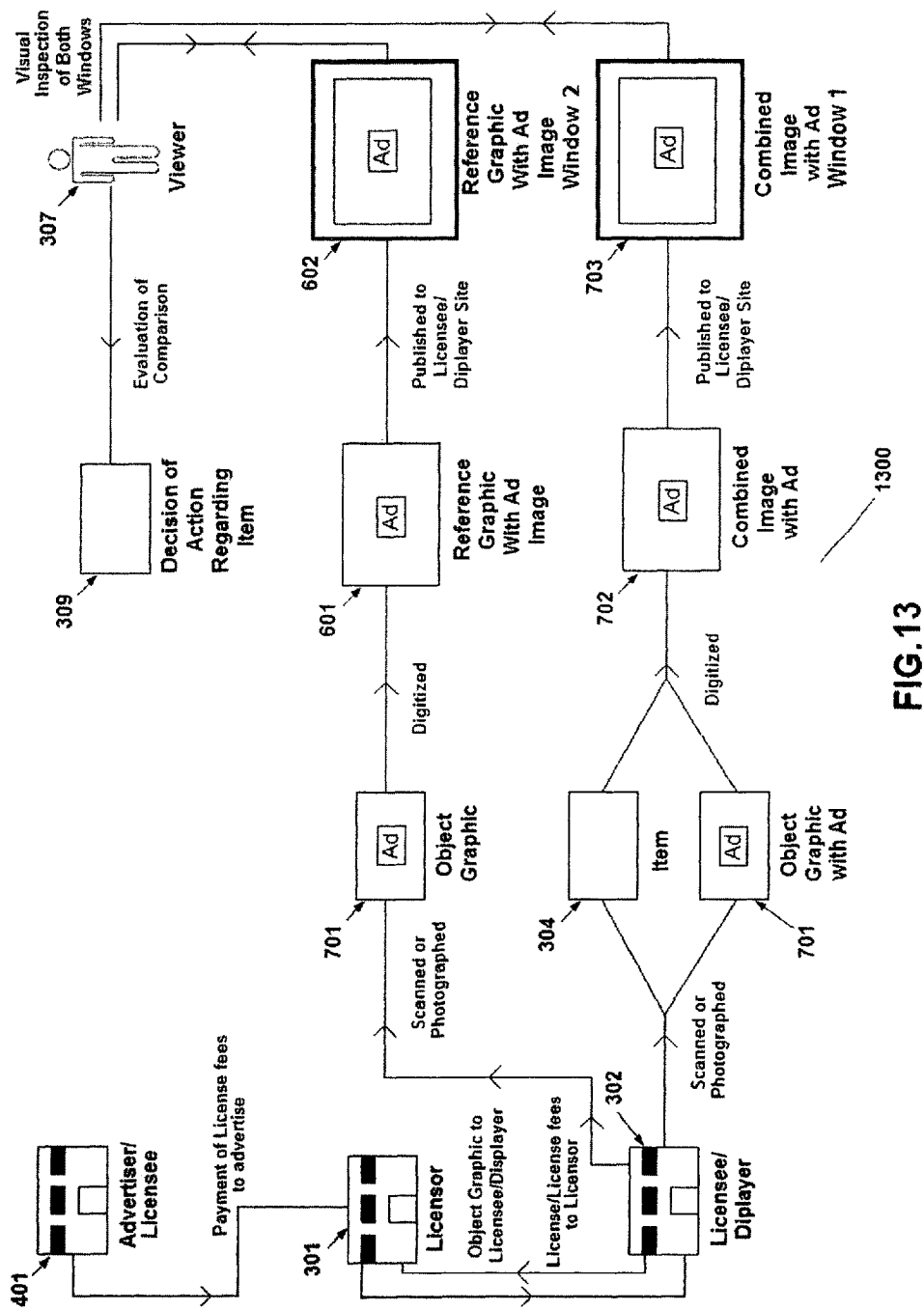
FIG. 13 is a general schematic view illustrating the relationships of the preferred licensing and business relationship of a licensor, displayer of items on the internet, advertiser, viewer of images on the internet and the procedure whereby the viewer can evaluate the image of items displayed on the internet by viewing the reference graphic with adverting on the displayer's website according to an alternate preferred embodiment of the present invention.

Referring to FIG. 13, a general schematic view is presented illustrating the relationships, according to an alternate preferred embodiment of the present invention, of the preferred licensing and business relationship of a licensor, at least one licensee/displayer of items on the internet, at least one advertiser, and at least one viewer of images on the internet. According to an alternate preferred embodiment of the present invention, the Method for evaluating images displayed on internet using a digitized reference graphic with advertising image supplied by the licensee/displayer and published to his own internet site 1300 preferably permits a Viewer 307 to evaluate the color, clarity and depiction of the image of an item 304 presented for viewing on the internet by a Licensee/Displayer 302 that the Viewer 307 sees in a Combined Image With Ad Window 1 703 of a personal computer enabling him to make a Decision of Action Regarding the Item 309.

According to an alternate preferred embodiment of the present invention, Licensor 301 licenses or sells advertising space on the object graphic to the Advertiser 401. The Licensor 301 licenses or sells a hardcopy of the Object Graphic With Ad 701 to the Licensee/Displayer 302 who scans or photographs the Object Graphic with Ad 701 alongside an Item 304 he wishes to display on the internet. A Combined Image With Ad 702 of the Item 304 and the Object Graphic With Ad 701 is digitized as a result of the photographing or scanning process and the Licensee/Displayer 302 publishes this Combined Image With Ad 702 to an internet site which appears to the Viewer 307 in the Combined Image With Ad Window 1 703 on a personal computer. The Licensee/Displayer scans or photographs the Object Graphic With Ad 701 which is identical to the Reference Graphic. A Reference Graphic Image With Ad 601 is digitized as a result of the scanning or photographing of the Object Graphic With Ad 701 and the Licensee/Displayer publishes it to the Licensee/Displayer's internet site, which appears to the Viewer 307 in the Reference Graphic With Ad Image Window 2 602 on a personal computer monitor. Both the Reference Graphic With Ad Image Window 2 602 and the Combined Image With Ad Window 1 703 are opened concurrently and the Viewer 307 sees both windows. The Viewer 307 is thus able to visually inspect and compare the color, clarity and depiction of the image of the Object Graphic With Ad 701 as it appears in the Combined Image with Ad Window 1 703 with the color, clarity and depiction of the image of the Reference Graphic With Ad Image 601 as it appears in the Reference Graphic With Ad Image Window 2 602. To the extent that the color, clarity of the Object Graphic With Ad 701 as it appears in the Combined Image With Ad Window 1 703 matches the color, clarity and depiction of the Reference Graphic With Ad Image 601 as it appears in the Reference Graphic With Ad Image Window 2 602, the Viewer 307 is able to ascertain the degree to which the color, clarity and depiction of the Item 304 is accurately portrayed in the Combined Image With Ad Window 1 703. As a result of this visual inspection and comparison process, the Viewer 307 is able to evaluate the image of the Item 304 and is placed in a superior position to make a Decision of Action Regarding the Item 309, for example either purchasing or not purchasing the Item 304.

Figure 14:
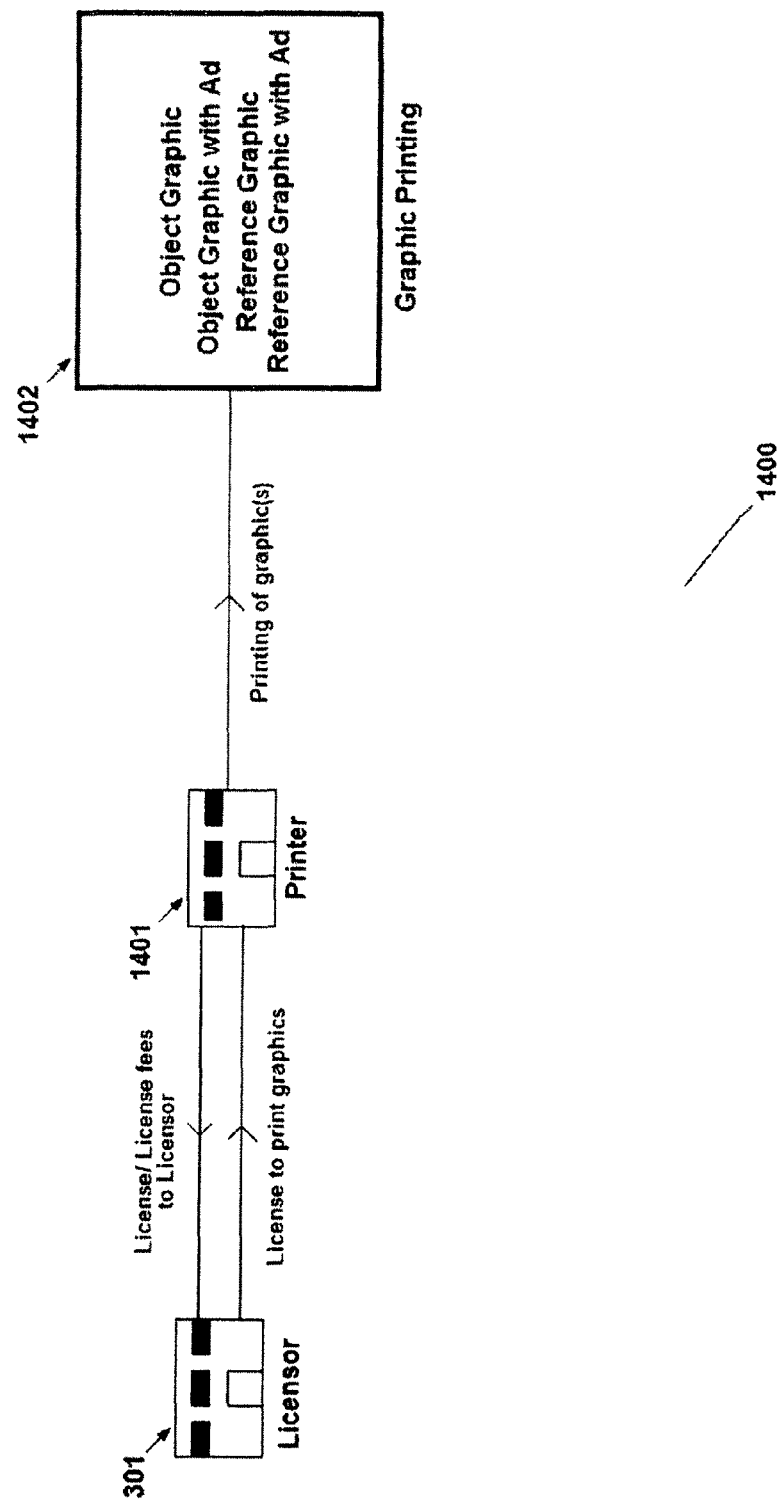
FIG. 14 is a general schematic view illustrating the relationships of the preferred licensing and business relationship of a licensor and the printer of any version of the reference graphic/object graphic—with or without advertising—according to an alternate preferred embodiment of the present invention.

Referring to FIG. 14, a general schematic view is presented illustrating the relationships, according to a preferred embodiment of the present invention, of the preferred licensing and business relationship of a licensor and at least one printer. According to a preferred embodiment of the present invention, the Method for evaluating images displayed on internet allowing for licensing arrangements with printers 1400 preferably permit's the Licensor 301 to license a Printer 1401 the right to print graphics as described herein (See FIGS. 1 through 17) embodied in Graphic Printing 1402.

According to a preferred embodiment of the present invention, the Licensor 301 licenses the Printer 1401 the right to print hardcopies of all versions of the Graphic 1402 and the Printer 1401 pays the Licensor 301 licensing fees in consideration for the license.

Figure 15:
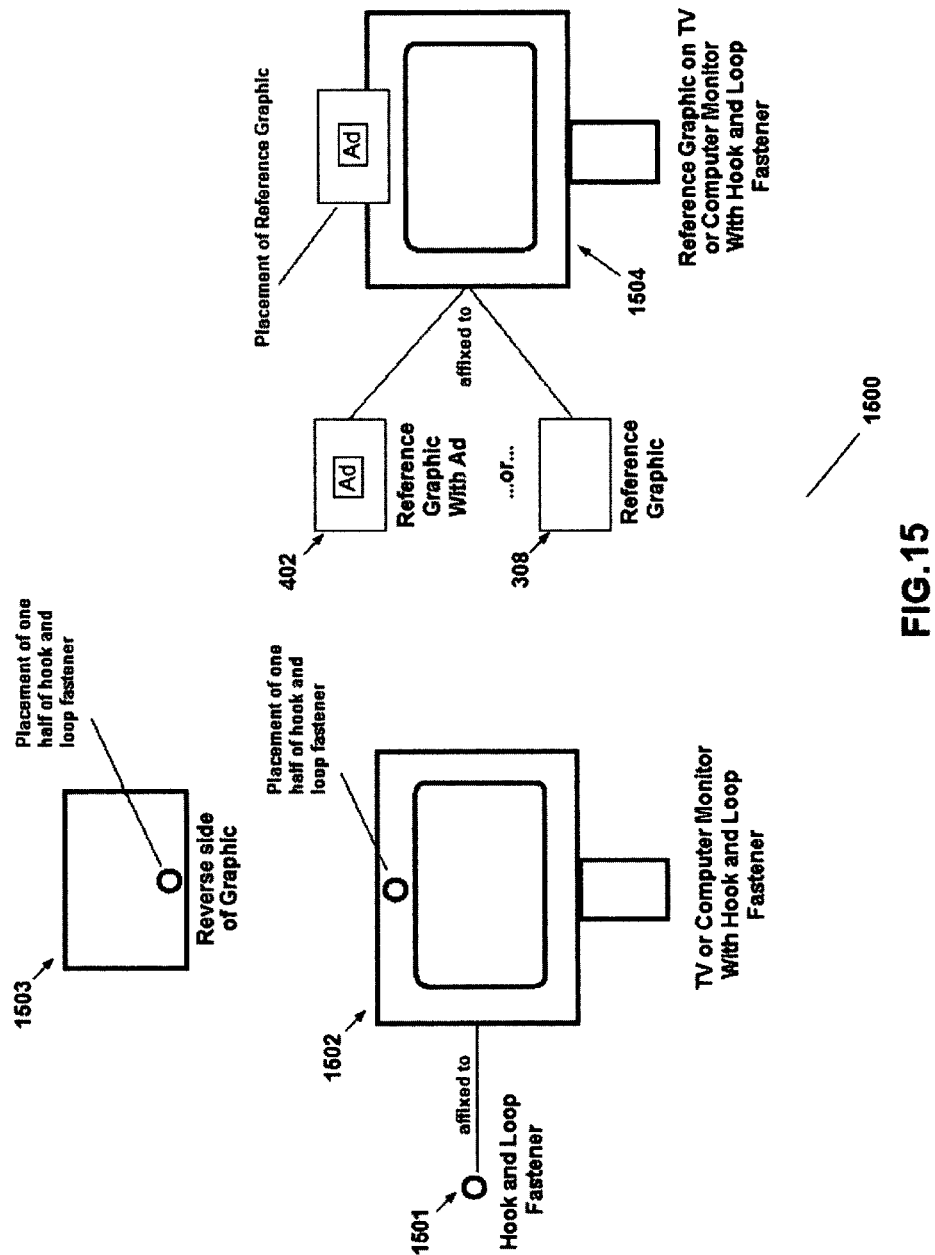
FIG. 15 is a general schematic view illustrating the placement of a hook and loop fastener on the reverse side of the hardcopy of the reference graphic—with or without advertising—for its affixing upon the frame of a television set or computer monitor according to an alternate preferred embodiment of the present invention.

Referring to FIG. 15, a general schematic view is presented illustrating the connectedness, according to an alternate preferred embodiment of the present invention, of at least one hardcopy of the Reference Graphic, one hook and loop fastener, and at least one TV or computer Monitor. According to a preferred embodiment of the present invention, the Method for evaluating images displayed on internet as it relates to affixing a Reference Graphic to a TV or Computer Monitor, 1500 preferably permits a hook and loop fastener 1501 to be attached to the Reverse Side of Graphic 1503 as well as the frame of a TV or Computer Monitor which results in the TV or Computer Monitor With a hook and loop fastener 1502. Thus, either a Reference Graphic With Ad 402 or a Reference Graphic 308 can be affixed, using the hook and loop fastener, to the TV or Computer Monitor With a hook and loop fastener 1502, resulting in the Object Graphic on TV or Computer Monitor With a hook and loop fastener 1504.

Figure 16:
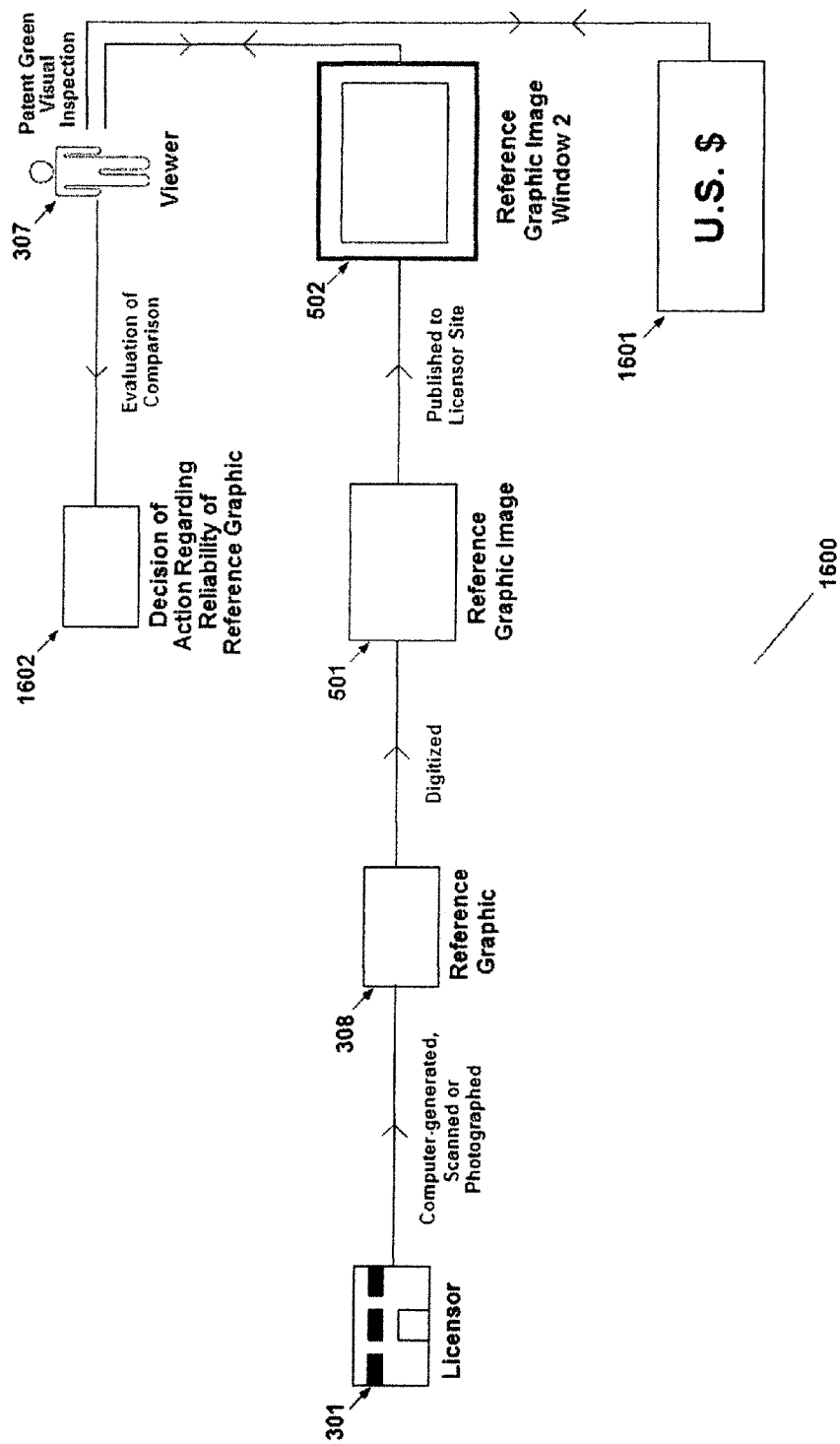
FIG. 16 is a general schematic view illustrating the relationship of a licensor and viewer of images on the internet and the procedure whereby the viewer can determine the accuracy of the colors of the digitized version of the reference graphic found on the licensor's website by examining and comparing the patent green color bars of the digitized reference graphic with the patent green color of U.S. currency the viewer holds in his hands and views simultaneously with the digitized version according to an alternate preferred embodiment of the present invention.

Referring to FIG. 16, a general schematic view is presented illustrating the relationships, according to a preferred embodiment of the present invention, of the preferred licensing and business relationship of a licensor and at least one viewer of images on the internet. According to a preferred embodiment of the present invention, the Method for evaluating images displayed on internet while ensuring color clarity of the Reference Graphic image by examining the "Patent Green" bars of the Reference Graphic 1600 preferably permits a Viewer 307 to evaluate the color consistency of the Reference Graphic 308 which is displayed in a viewing window on the internet referred to as the Reference Graphic Image Window 2 502 with the color of U.S. currency 1601 so that the Viewer 307 can make a Decision of Action Regarding the Reliability of the Reference Graphic 1602.

According to a preferred embodiment of the present invention, the Licensor 301 computer-generates, scans or photographs the Reference Graphic 308. A Reference Graphic Image 501 is digitized as a result and the Licensor 301 publishes it to the Licensor's internet site, which appears in the Reference Graphic Image Window 2 502 on a personal computer monitor. The Viewer 307 views and compares the Patent Green color in the Reference Graphic Image Window 2 502 with the Patent Green color of U.S. currency 1601 of which he possesses, which is a hardcopy. He holds this currency up to the computer monitor. To the extent that the Patent Green color of the Reference Graphic 308 as it appears in the Reference Graphic Image Window 2 502 matches the color of the U.S. Currency 1601, the Viewer 307 is able to ascertain the degree to which the color of the Reference Graphic 308 is reliable and is put in a superior position to make a Decision of Action Regarding the Reliability of the Reference Graphic 1602.

Figure 17:
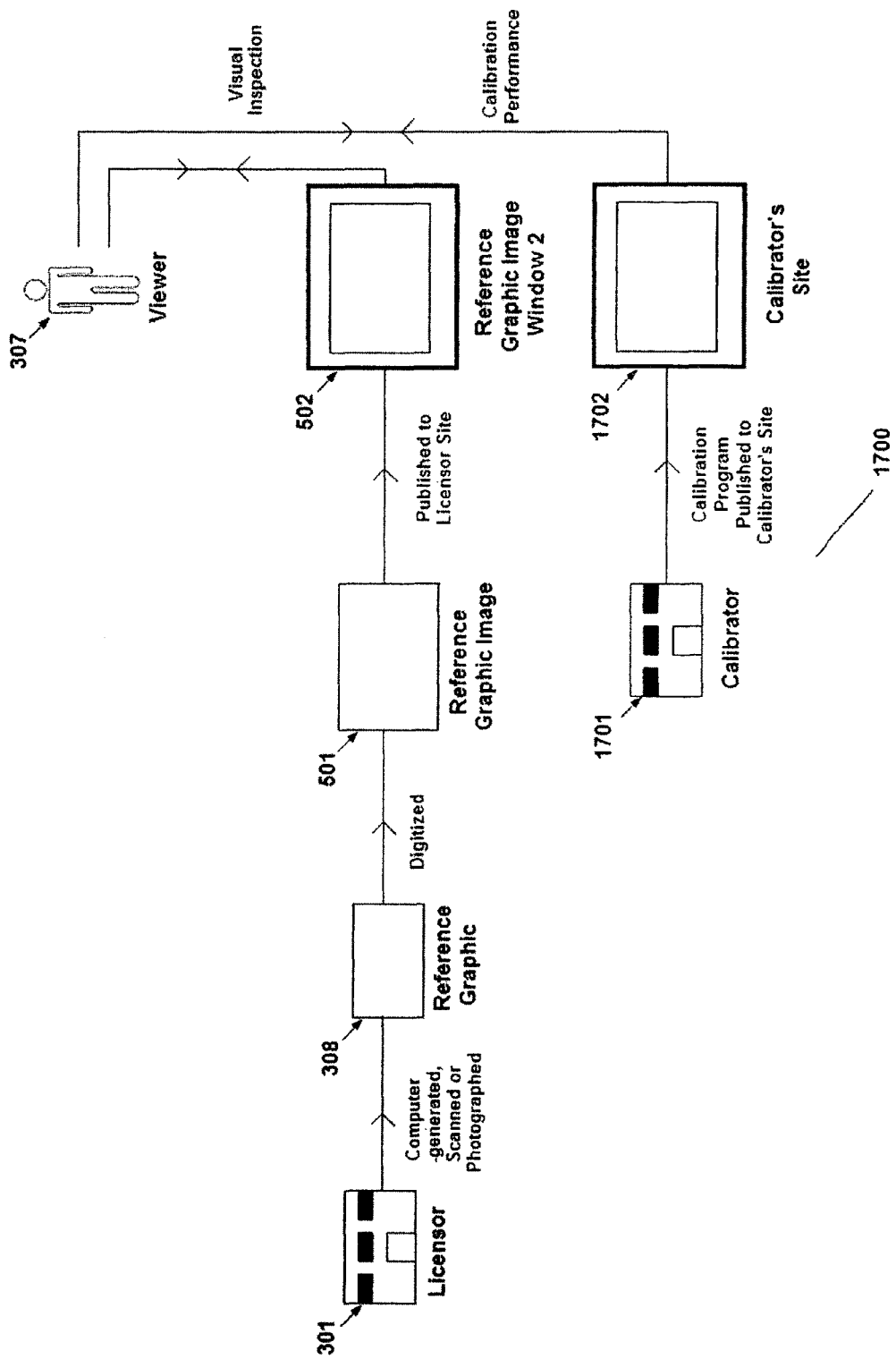
FIG. 17 is a general schematic view illustrating the relationship of a licensor, viewer of images on the internet, a calibrator, the calibrator's program and the procedure whereby the viewer can calibrate the reference graphic he views in order to determine the accuracy of the colors provided by the viewing monitor he is viewing according to a preferred embodiment of the present invention.

Referring to FIG. 17, a general schematic view is presented illustrating the relationships, according to an alternate preferred embodiment of the present invention, of the preferred relationship of a licensor, at least one viewer of images on the internet, and at least one Calibrator. According to an alternate preferred embodiment of the present invention, the Method for calibrating the digitized version Reference Graphic 1700 preferably permits a Viewer 307 to evaluate the color, clarity and depiction of the digitized version of the Reference Graphic Image 502 he is viewing by performing a calibration program provided by a Calibrator 1701 at the Calibrator's Site 1702.

According to an alternate preferred embodiment of the present invention, the Licensor 301 computer-generates, scans or photographs the Reference Graphic 308. A Reference Graphic Image 501 is digitized as a result of the computer-generating, scanning or photographing of the Reference Graphic 308 and the Licensor publishes it to the Licensor's internet site, which appears to the Viewer 307 in the Reference Graphic Image Window 2 502 on the monitor of a personal computer. A Calibrator 1701 publishes a Calibration Program to the Calibrator's Site 1702. According to the instructions provided to the Viewer 307 by the Calibrator's Site 1702, he performs a Calibration on the Reference Graphic Image Window 2 502.

Referring to FIG. 18, the graphic in the form of a company's logo used in the image evaluation process is presented. According to an alternate preferred embodiment of the present invention, this graphic 1800 will be in the shape of a company's logo and/or its catch-phrase and the solid fill of the logo and/or the lettering of its catch-phrase will be identical to the colors and shapes as depicted in graphic 100

Although applicant has described applicant's preferred embodiments of this invention, it will be understood that the broadest scope of this invention includes modifications such as diverse shapes, sizes, and materials. Such scope is limited only by the below claims as read in connection with the above specification.

Further, many other advantages of applicant's invention will be apparent to those skilled in the art from the above descriptions and the below claims.

What is claimed is:

1. A method for evaluating Internet images displayed on computer monitors and televisions, comprising:
    displaying a digitized object graphic, wherein the object graphic is a rectangular-shaped graphic containing specific colors, lines and shading that resembles a test pattern, wherein two sections of the object graphic comprise a first section made up of reproductions of snippets of various United States currency and a second section which is solid Patent Green;
    receiving a reference graphic, wherein graphic reference is a hardcopy of the object graphic;
    offering, by a licensor, at least one item for sale by displaying images on the Internet;
    creating and displaying a digitized combined image, wherein the digitized combined image includes the at least one colorful item for sale and the object graphic;
    placing the reference graphic on a frame of a computer monitor or a television using at least one hook and loop fastener to affix the reference graphic to the frame;
    visually inspecting, by at least one potential purchaser, the color, clarity and depiction of the digitized combined image and comparing the color and clarity of the digitized combined image with the hardcopy reference graphic to determine if the object graphic in the digitized combined image matches the reference object; and
    making, by the at least one potential purchaser, a decision of action regarding the at least one item for sale based upon the visual inspection and comparison.

2. The method according to claim 1, further comprising photographing or scanning.

3. The method according to claim 1, further comprising evaluating images of a company's logo and/or catch-phrase.

4. The method according to claim 1, evaluating images of an advertising.

* * * * *